(12) United States Patent
Lasserre et al.

(10) Patent No.: US 12,755,438 B2
(45) Date of Patent: Oct. 6, 2026

(54) METHOD AND APPARATUS OF POINT CLOUD GEOMETRY DATA SENSED BY AT LEAST ONE SENSOR

(71) Applicant: BEIJING XIAOMI MOBILE SOFTWARE CO., LTD., Beijing (CN)

(72) Inventors: Sebastien Lasserre, Beijing (CN); Jonathan Taquet, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 242 days.

(21) Appl. No.: 18/687,773

(22) PCT Filed: Jun. 17, 2022

(86) PCT No.: PCT/CN2022/099613
§ 371 (c)(1),
(2) Date: Feb. 28, 2024

(87) PCT Pub. No.: WO2023/029671
PCT Pub. Date: Mar. 9, 2023

(65) Prior Publication Data

US 2024/0362824 A1 Oct. 31, 2024

(30) Foreign Application Priority Data

Aug. 31, 2021 (EP) .................................... 21306181

(51) Int. Cl.
*G06T 9/00* (2006.01)

(52) U.S. Cl.
CPC .................................... *G06T 9/001* (2013.01)

(58) Field of Classification Search
CPC ...................................................... G06T 9/001
See application file for complete search history.

(56) References Cited

U.S. PATENT DOCUMENTS 9,869,754 B1 1/2018 Campbell et al.
11,902,348 B2 * 2/2024 Hur ......................... H04L 67/06
(Continued)

FOREIGN PATENT DOCUMENTS

WO WO 2021084295 A1 5/2021

OTHER PUBLICATIONS

ISO/IEC JTC 1/SC 29/WG 7, N00167, MPEG 3D Graphics Coding, Technologies under Consideration in G-PCC, Jul. 2021 (Year: 2021).*
(Continued)

*Primary Examiner* — Michael Robert Cammarata
(74) *Attorney, Agent, or Firm* — Cozen O'Connor

(57) ABSTRACT

The method of encoding/decoding a point cloud sensed by any type of sensor following a sensing path obtains coarse representations of sensed points and encodes the sensing path and the coarse representations. The sensing path and coarse representations of points are decoded, and points of the point cloud are reconstructed from the decoded sensing path and the decoded coarse representations. The coarse representations of sensed points of the point cloud are coarse points defined in a two-dimensional angular coordinate space, and a coarse point is obtained by shifting a sensing point in the two-dimensional angular coordinate space with shifting values that depend on the sensor index associated with the sensor that sensed the point P of the point cloud.

16 Claims, 11 Drawing Sheets

(56) References Cited

U.S. PATENT DOCUMENTS

| | | | | |
|---|---|---|---|---|
| 12,236,651 | B2 * | 2/2025 | Taquet | G06T 9/40 |
| 2017/0307736 | A1 | 10/2017 | Donovan | |
| 2020/0394822 | A1 * | 12/2020 | Gao | G01S 17/89 |
| 2021/0400103 | A1 * | 12/2021 | Hur | H04L 67/06 |
| 2021/0407143 | A1 * | 12/2021 | Van der Auwera | H04N 19/91 |
| 2022/0108488 | A1 * | 4/2022 | Ramasubramonian | H04N 19/597 |
| 2022/0358686 | A1 * | 11/2022 | Lasserre | H04N 19/96 |
| 2022/0398784 | A1 * | 12/2022 | Taquet | G06T 9/001 |
| 2023/0401754 | A1 * | 12/2023 | Champel | H03M 7/70 |
| 2023/0419552 | A1 * | 12/2023 | Oh | H04N 19/96 |
| 2024/0029317 | A1 * | 1/2024 | Ramasubramonian | G06T 9/001 |
| 2024/0046524 | A1 * | 2/2024 | Lasserre | H04N 19/182 |
| 2024/0163480 | A1 * | 5/2024 | Lasserre | G06T 9/001 |
| 2024/0185475 | A1 * | 6/2024 | Gao | H04N 19/90 |
| 2024/0187631 | A1 * | 6/2024 | Lasserre | H04N 19/90 |
| 2024/0371047 | A1 * | 11/2024 | Lasserre | G06T 9/001 |
| 2024/0386614 | A1 * | 11/2024 | Oh | H04N 19/70 |
| 2024/0404116 | A1 * | 12/2024 | Lasserre | G06T 9/001 |

OTHER PUBLICATIONS

Najdataei, Hannaneh, et al. "Lisco: A continuous approach in lidar point-cloud clustering." arXiv preprint arXiv:1711.01853 (2017). (Year: 2017).*

Adarsh K. Ramasubramonian, et al., "[G-PCC][New proposal] Laser index clipping in predictive geometry", Int'l Org. for Standardisation Organisation Internationale De Normalisation ISO/IEC JTC 1/SC 29/WG 7 Coding of Moving Pictures and Audio, ISO/IEC JTC 1/SC 29/WG 7 m55384, Online—Oct. 2020 (Year: 2020).*

ISO/IEC 23090-9:2020(E), ISO/IEC JTC 1/SC 29/WG 11, Information technology—MPEG-1 (Coded Representation of Immersive Media)—Part 9: Geometry-based Point Cloud Compression (Year: 2020).*

European Patent Application No. 21306181.5, Search and Opinion dated Feb. 24, 2022, 13 pages.

PCT/CN2022/099613 Search Report and Written Opinion dated Sep. 16, 2022, 9 pages.

ISO/IEC JTC 1/SC 29/WG 7 "Technologies under Consideration in G-PCC" No. n20648, Jul. 2021, 44 pages.

Lasserre (Xiaomi) S et al "[GPCC-EE13.53] Algorithmic explanation of the new Lidar Codec LL-LC2", No. m57073, Jun. 2021, 37 pages.

Flynn, D, et al. "G-PCCLiDaR scan pattern survey" MPEG Meeting, Jul. 2021, 33 pages.

Graziosi, D. et al. "An overview of on going point cloud compression standardization activities: video-based (V-PCC) and geometry-based (G-PCC)" Cambridge University Press; SIP (2020), vol. 9, e13, pp. 1-17.

Indian Patent Application No. 202447024107, Office Action dated Mar. 11, 2026, 9 pages.

* cited by examiner

METHOD AND APPARATUS OF POINT CLOUD GEOMETRY DATA SENSED BY AT LEAST ONE SENSOR

CROSS-REFERENCE TO RELATED APPLICATIONS

This application is a National Stage of International Application No. PCT/CN2022/099613, filed on Jun. 17, 2022, which claims priority to European Patent Application No. 21306181.5 filed on Aug. 31, 2021, the entire content of which is hereby incorporated by reference for all purposes.

FIELD

The present disclosure generally relates to point cloud compression and, in particular to methods and apparatus of encoding/decoding point cloud geometry data sensed by at least one sensor.

BACKGROUND

The present section is intended to introduce the reader to various aspects of art, which may be related to various aspects of at least one embodiments of the present disclosure that is described and/or claimed below. This discussion is believed to be helpful in providing the reader with background information to facilitate a better understanding of the various aspects of the present disclosure.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of geometry data (locations of the points in a 3D space usually represented by 3D cartesian coordinates x,y and z) and attributes.

Point clouds may be sensed by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, aka Moving Picture Experts Group or MPEG, initiated work items on point cloud compression. This has led to two standards, namely

- MPEG-I part 5 (ISO/IEC 23090-5) or Video-based Point Cloud Compression (aka V-PCC)
- MPEG-I part 9 (ISO/IEC 23090-9) or Geometry-based Point Cloud Compression (aka G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-sensed sparse geometry data.

The G-PCC coding method has two schemes for the compression of a sensed sparse geometry data.

The first scheme is based on an occupancy tree, being locally any type of tree among octree, quadtree or binary tree, representing the point cloud geometry. Occupied nodes are split down until a certain size is reached, and occupied leaf nodes provide the 3D locations of points, typically at the center of these nodes. The occupancy information is carried by occupancy flags signaling the occupancy status of each of the child nodes of nodes. By using neighbor-based prediction techniques, high level of compression of the occupancy flags can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de)coding is performed after complete geometry (de)coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactory solved by existing point cloud codecs.

An important use case is the transmission of sparse geometry data sensed by at least one sensor mounted on a moving vehicle. This usually requires a simple and low latency embarked encoder. Simplicity is required because the encoder is likely to be deployed on computing units which perform other processing in parallel, such as (semi-) autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific techniques related to spinning Lidar-sensed sparse geometry data have been already been exploited in G-PCC and have led to very significant gains of compression.

First, G-PCC exploits the elevation angle (relative to the horizontal ground) of sensing from a spinning Lidar head 10 as depicted on FIGS. 1 and 2. A Lidar head 10 comprises a set of sensors 11 (for example lasers), here five sensors are represented. The spinning Lidar head 10 may spin around a vertical axis z to sense geometry data of a physical object. Lidar-sensed geometry data is then represented in spherical coordinates ($r_{3D}$,$\phi$,$\theta$), where $r_{3D}$ is the distance of a point P from the Lidar head's center, $\phi$ is an azimuthal angle of the Lidar head's spin relative to a referential, and $\theta$ is an elevation angle of a sensor k of the spinning Lidar head 10 relative to a horizontal referential plane.

A regular distribution along the azimuthal angle has been observed on Lidar-sensed data as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i \forall i=0$ to I−1 where I is a number of azimuthal angles used for the sensing of the points and $\theta_j \forall j=0$ to J−1 where J is a number of sensors of the spinning Lidar head 10. Basically, G-PCC represents Lidar-sensed sparse geometry data on a two-dimensional (discrete) angular coordinate space ($\phi$,$\theta$) as depicted on FIG. 3, together with a radius value $r_{3D}$ for each point.

This quasi 1D property has been exploited in G-PCC in both the occupancy tree and the predictive tree by predicting, in the spherical coordinate space, the location of a current point based on an already coded point by using the discrete nature of angles.

More precisely, the occupancy tree uses DCM intensively and entropy codes the direct locations of points within a node by using a context-adaptive entropy coder. Contexts are then obtained from the local conversion of the point locations into angular coordinates ($\phi$,$\theta$) and from the location of these angular coordinates relative to discrete angular coordinates ($\phi_i$,$\theta_j$) obtained from precedingly coded points. The predictive tree directly codes a first version of a point location in the angular coordinates ($r_{2D}$,$\phi$,$\theta$), where $r_{2D}$ is the projected radius on the horizontal xy plane as depicted on FIG. 4, using the quasi 1D nature ($r_{2D}$,$\phi_i$,$\theta_j$) of this angular coordinate space. Then, spherical coordinates ($r_{2D}$,$\phi$,$\theta$) are converted into 3D cartesian coordinates (x,y,z) and a xyz residual is coded to tackle the errors of coordinate conversion, the approximation of elevation and azimuthal angles and potential noise.

G-PCC does use the angular priors to better compress spinning Lidar-sensed sparse geometry data but does not adapt the coding structure to the order of sensing. By its very nature, the occupancy tree must be coded down to its last depth before outputting a point. This occupancy is coded in the so-called breadth-first order: the occupancy of the root node is first coded, indicating its occupied child nodes; then the occupancy for each of the occupied child nodes is coded, indicating the occupied grand-child nodes; and so on iteratively over the tree depth until leaf nodes can be determined and the corresponding points are provided/output to an application or to the attribute(s) coding scheme. Regarding the predictive tree, the encoder is free to choose the order of point in the tree, but to obtain good compression performance, to optimize the prediction accuracy, G-PCC proposes to code one tree per sensor. This has mainly the same drawback as using one coding slice per sensor, i.e. non-optimal compression performance because prediction between sensors is not allowed and does not provide encoder low latency. Worse, one should have one coding processing per sensor and the number of core coding units should equal the number of sensors; this is not practical.

In brief, in a framework of a spinning sensors head used for sensing sparse geometry data of a point cloud, prior arts do not solve the problem of combining encoding and decoding simplicity, low latency and compression performance.

Moreover, sensing sparse geometry data of point cloud by using spinning sensors head has some drawbacks and other types of sensor head may be used.

The mechanical parts generating the spin (rotation) of a spinning sensors head are prone to breakage and are costly. Also, by construction, the angle of view is necessarily 2π. This does not allow to sense a particular region of interest with high frequency, for instance it may be more interesting to sense in front of a vehicle than behind. Practically in most cases, when a sensor is attached to a vehicle, most of the 2π angle of view is screened by the vehicle itself and the screened angle of view does not need to be sensed.

New types of sensors have emerged recently, allowing for a more flexible selection of the region to be sensed. In most recent designs, a sensor can be more freely and electronically (thus avoiding fragile mechanical parts) moved to obtain a large variety of sensing path in the 3D scene as depicted on FIG. 5. On this FIG. 5, a set of four sensors is shown. Their relative sensing directions, i.e. azimuthal and elevation angles, are fixed relative to each other, however they overall sense a scene following a programmable sensing path depicted by dashed lines on the two-dimensional angular coordinate (ϕ,θ) space. Points of the point cloud may then be sensed regularly along the sensing path. Some sensor head may also adapt their sensing frequency by increasing their sensing frequency when a region of interest R has been detected as illustrated on FIG. 6. Such a region of interest R may be associated with a close object, a moving object, or any object (pedestrian, other vehicle, etc.) precedingly segmented, for instance in a previous frame, or dynamically segmented during the sensing. FIG. 7 illustrates another example of a sensing path (typical zigzag sensing path) used by a sensor head comprising two sensors able to increase their sensing frequencies when a region of interest has been detected (grey shaded points and grey hashed points). Using a zigzag sensing path may be advantageously used to sense a limited (azimuthal) angular sector of a 3D scene. Because sensors may be attached to a vehicle, their viewports of interest are necessarily limited by the presence of the vehicle itself that obstructs the scene, unless the sensors are located at the top of the car. Consequently, sensors with a limited probing angular sector are of high interest and easier to integrate to a vehicle.

As is illustrated on FIG. 8, a sensor head comprising a single sensor may also be used to sense multiple positions (two vertical positions on FIG. 8), for instance using reflections on mirrors oscillating with rotations (here vertical rotations). In that case, instead of using a set of sensors, a single sensor at different angular positions (i.e. with different elevation angle on FIG. 8) along a sensing path (here a zigzag sensing path) is used mimicking a sensing using a set of multiple sensors. For the sake of simplicity, in the following descriptions and claims, the "sensor head" may refer to a set of physical sensors or a set of sensing elevation indexes mimicking a set of sensors as well. Also, one skilled in the art will understand when "a sensor" could also refer to a sensor in each sensing elevation index position.

Combining together requirements on encoder and decoder simplicity, on low latency and on compression performance of point cloud sensed by any type of sensors is still a problem that has not been satisfactory solved by existing point cloud codecs.

At least one embodiment of the present disclosure has been devised with the foregoing in mind.

SUMMARY

According to a first aspect of the present disclosure, there is provided a method of encoding points of a point cloud sensed by at least one sensor associated with a sensor index into a bitstream of encoded point cloud data, wherein the method comprises: encoding, into the bitstream, an information representing a sensing path, wherein the sensing path is defined in a two-dimensional angular coordinate space comprising an azimuthal coordinate representative of an azimuthal angle representing a sensing angle of a sensor relative to a referential and an elevation coordinate representative of an elevation angle of a sensor relative to a horizontal referential plane; the sensing path is used to sense the points of the point cloud according to ordered coarse points representing potential locations of sensed points of the point cloud, each coarse point being defined in the two-dimensional angular coordinate space from one sample index associated with a sensing time instant and one sensor index associated with a sensor; said sample index is defined along the sensing path according to a sensing scheme; for each point of the point cloud, obtaining one sensing point in the two-dimensional angular coordinate space from a sample index associated with a sensing time instant of the point of the point cloud along the sensing path, and the sensing scheme; obtaining one coarse point in the two-dimensional angular coordinate space by shifting the sensing point in the two-dimensional angular coordinate space with shifting values that depend on the sensor index associated with the sensor that sensed the point of the point cloud; and encoding, into the bitstream, the point of the point cloud relatively to the coarse point.

According to a second aspect of the present disclosure, there is provided a method of decoding points of a point cloud sensed by at least one sensor associated with a sensor index from a bitstream of encoded point cloud data, wherein the method comprises decoding, from the bitstream, an information representing a sensing path wherein the sensing path is defined in a two-dimensional angular coordinate space comprising an azimuthal coordinate representative of an azimuthal angle representing a sensing angle of a sensor relative to a referential and an elevation coordinate representative of an elevation angle of a sensor relative to a horizontal referential plane; the sensing path has been used to sense the points of the point cloud according to ordered coarse points representing potential locations of sensed points of the point cloud, each coarse point being defined in the two-dimensional angular coordinate space from one sample index associated with a sensing time instant and one sensor index associated with a sensor; said one sample index is defined along the sensing path according to a sensing scheme; for each point of the point cloud, obtaining one sensing point in the two-dimensional angular coordinate space from a sample index associated with a sensing time instant of the point of the point cloud along the sensing path, and the sensing scheme; obtaining a coarse point in the two-dimensional angular coordinate space by shifting the sensing point in the two-dimensional angular coordinate space with shifting values that depend on the sensor index associated with the sensor that sensed the point of the point cloud; and decoding a point of the point cloud relatively to the coarse point.

In some embodiments, angular coordinates of the coarse point are obtained by shifting angular coordinates of the sensing point in the two-dimensional angular coordinate space by an azimuthal angle shifting coefficient and an elevation angle shifting coefficient, both depending on the sensor index.

In some embodiments, the azimuthal angle shifting coefficient and/or elevation angle shifting coefficient may be encoded or decoded relatively to at least one previously encoded azimuthal angle shifting coefficient and at least one previously encoded elevation angle shifting coefficient corresponding to at least one other sensor index.

In some embodiments, the azimuthal angle shifting coefficients equal zero.

In one embodiment, the sum of the azimuthal angle shifting coefficients equals 0 and the sum of elevation angle shifting coefficients equals 0.

In some embodiments, the angular coordinates of the coarse point is obtained by further shifting the angular coordinates of the sensing point in the two-dimensional angular coordinate space by an offset depending on a sensing delay and a two-dimensional angular velocity of the sensing point.

In some embodiments, the sensing delay is encoded into the bitstream.

In some embodiments, the sensing path corresponds to a sensing trajectory of a particular sensor of reference.

According to a third aspect of the present disclosure, there is provided an apparatus of encoding points of a point cloud sensed by at least one sensor associated with a sensor index into a bitstream of encoded point cloud data. The apparatus comprising one or more processors configured to carry out a method according to the first aspect of the present disclosure.

According to a fourth aspect of the present disclosure, there is provided an apparatus of decoding points of a point cloud sensed by at least one sensor associated with a sensor index from a bitstream of encoded point cloud data. The apparatus comprising one or more processors configured to carry out a method according to the second aspect of the present disclosure.

According to a fifth aspect of the present disclosure, there is provided a non-transitory storage medium carrying instructions of program code for executing a method according to the first aspect of the present disclosure.

According to a sixth aspect of the present disclosure, there is provided a non-transitory storage medium carrying instructions of program code for executing a method according to the second aspect of the present disclosure.

BRIEF DESCRIPTION OF THE DRAWINGS

Reference will now be made, by way of example, to the accompanying drawings which show embodiments of the present disclosure, and in which.

Similar reference numerals may have been used in different figures to denote similar components.

DESCRIPTION OF EMBODIMENTS

Figure 1:
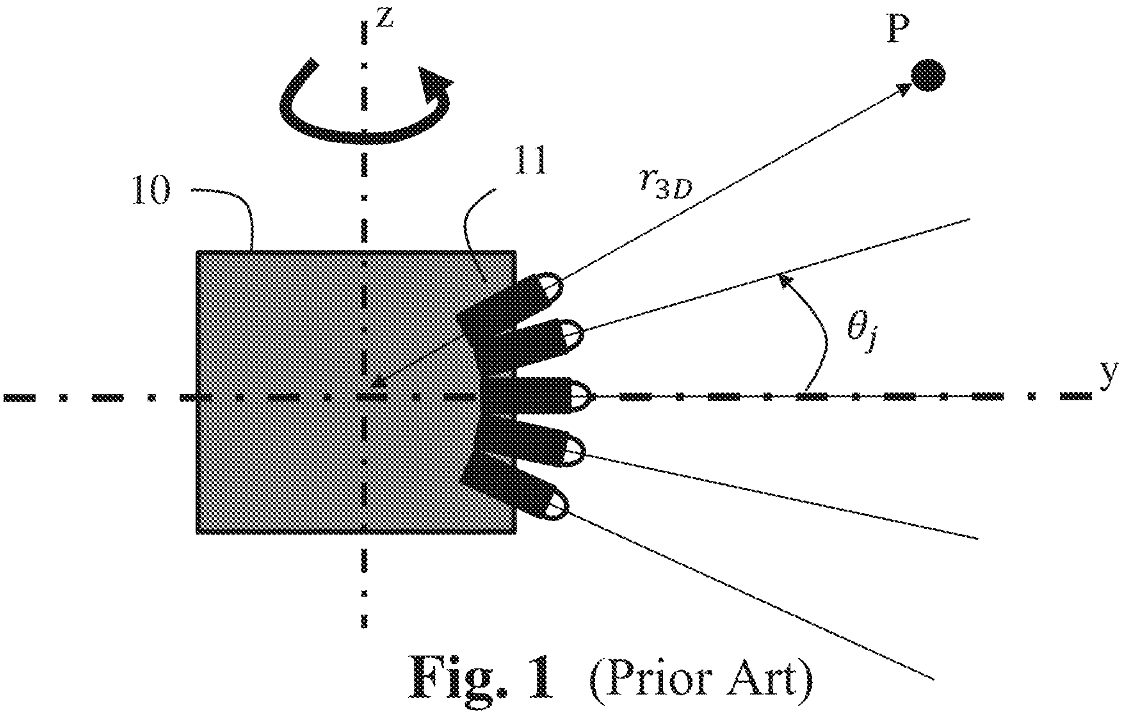
Fig. 1 (Prior Art)
FIG. 1 shows a side view of a sensor head and some of its parameters in accordance with prior art.
Figure 2:
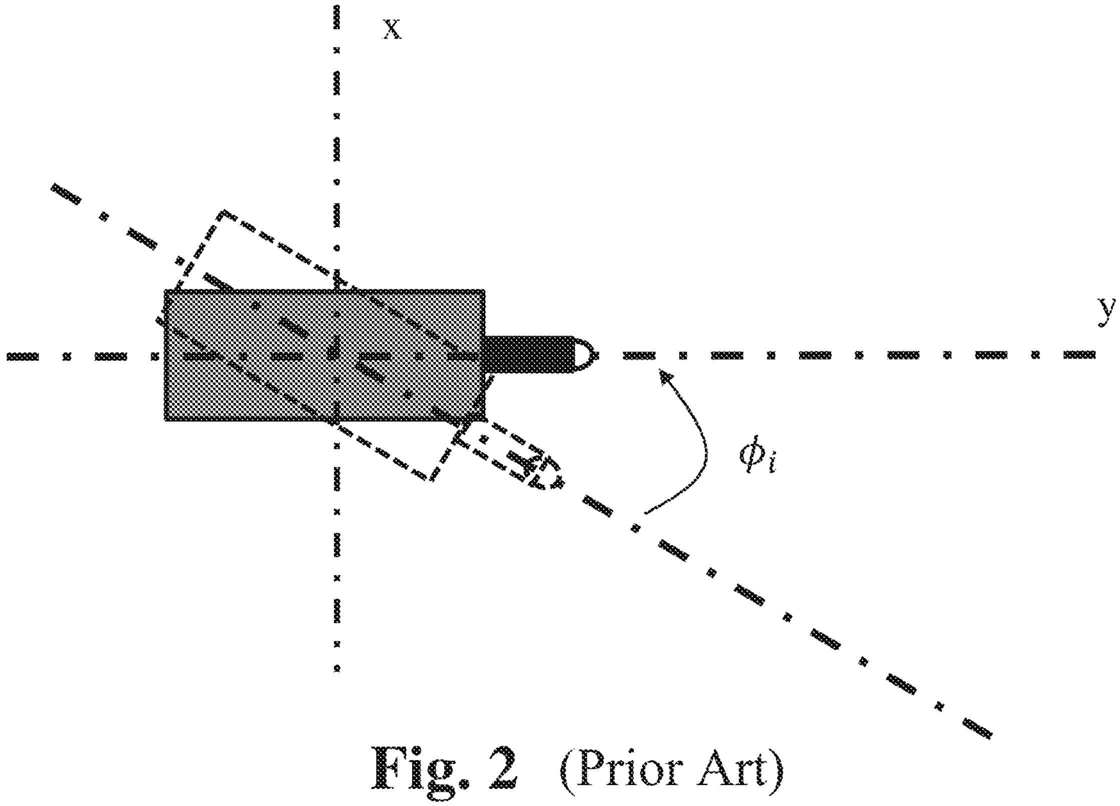
Fig. 2 (Prior Art)
FIG. 2 shows a top view of the sensor head and some of its parameters in accordance with prior art.
Figure 3:
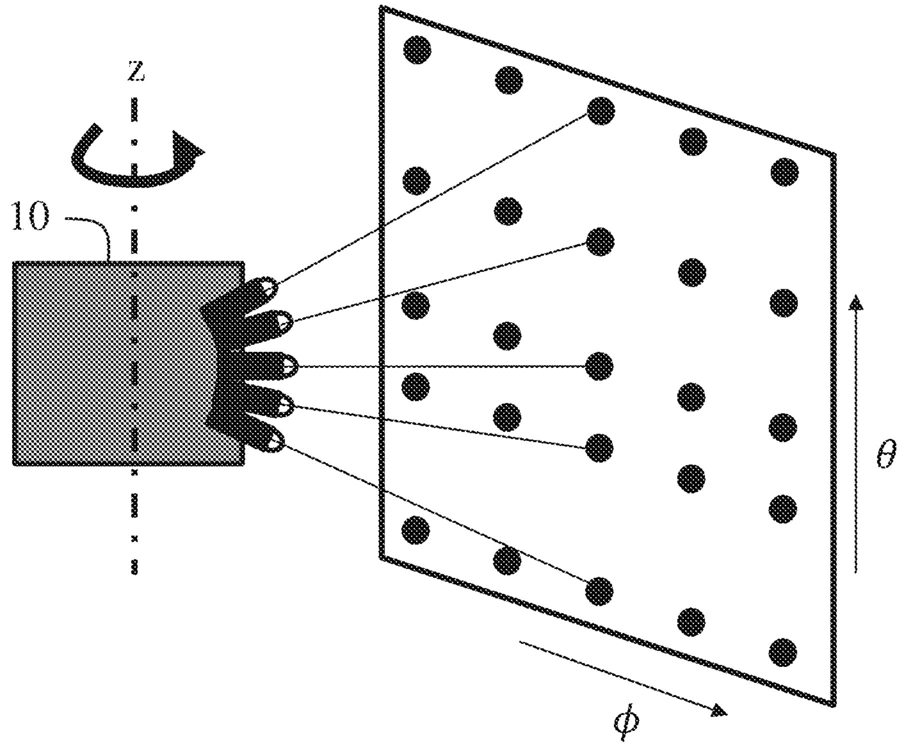
Fig. 3 (Prior Art)
FIG. 3 shows a regular distribution of data sensed by a spinning sensor head in accordance with prior art.

At least one of the embodiments is described more fully hereinafter with reference to the accompanying figures, in which examples of at least one of the embodiments are illustrated. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of the present disclosure.

At least one of the aspects generally relates to point cloud encoding and decoding, one other aspect generally relates to transmitting a bitstream generated or encoded and one other aspects relates to receiving/accessing a decoded bitstream.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present disclosure may be used individually or in combination.

In brief, the present invention relates to encoding/decoding a point cloud sensed by any type of sensor head according to a sensing path. Some examples of such sensor head and sensing paths are shown on FIGS. 3, 5-8 for only illustrative purpose because any type of sensor(s) may be used to sense points of a point cloud following any sensing path. The sensing path is encoded/decoded into a bitstream. The sensing path is defined from sensor characteristics in a two-dimensional angular coordinate space comprising an azimuthal coordinate representative of an azimuthal angle representing a sensing angle of a sensor associated with a referential and an elevation coordinate representative of an elevation angle of a sensor associated with a horizontal referential plane. The sensing path is used to sense the points of the point cloud according to ordered coarse points representing potential locations of sensed points of the point cloud. Each coarse point is defined from one sample index associated with a sensing time instant along the sensing path and one sensor index associated with a sensor. An order index is associated with each coarse point according to the rank of said coarse point among the ordered coarse points.

For each point of the point cloud, one sample index associated with a sensing time instant of the point of the point cloud and a sensor index of a sensor that sensed the point of the point cloud are obtained.

A couple, formed by a sample index and a sensor index, identifies a coarse point (potential location) of a sensed point of the point cloud. However, some of these potential locations may not be occupied by sensed points for multiple reasons. For example, when a sensor uses a laser beam to sense an object, the beam may not be reflected (no object) or may be too weakly reflected (due to adverse surface conditions) or may not be reflected within a predetermined temporal window (object too far), and no object is detected. Thus, the occupancies of the coarse points (potential locations) shall be encoded into the bitstream to signal whether a coarse point (potential location) is occupied by a sensed point. One order index difference is encoded into the bitstream to encode the occupancy of a coarse point by a sensed point of the point cloud. The order index difference represents a difference between an order index of a coarse point identified by the sample index and the sensor index, and an order index of another coarse point associated with a previous sensed point of the point cloud in the list of ordered coarse points. One sensing point in the two-dimensional angular coordinate space is obtained from the sample index and the sensing scheme. One coarse point in the two-dimensional angular coordinate space is obtained by shifting a sensing point in the two-dimensional angular coordinate space with shifting values that depend on the sensor index associated with the sensor that sensed the point of the point cloud. The point of the point cloud is then encoded into the bitstream relatively to the coarse point.

The present invention introduces the use of coarse points. An occupied coarse point occupied by a sensed point of the point cloud is a coarse representation of said sensed point and the angular coordinates of said sensed point may be encoded relatively to the angular coordinates of said occupied coarse point. Encoding a point of a point cloud relatively to a coarse point is valid independently of the used sensor head and any type of sensors may be used including, but not limited to particular sensor head such as a spinning sensors head or sensor head able to sense points of a point cloud following a programmable sensing path.

Introducing the coarse representation for coding point cloud geometry data is advantageous compared to G-PCC as it provides better compression gains, lower complexity, and also very low latency because points are proceeded, by both encoder and decoder, in their sensing order. The present invention obtains a coarse point in the two-dimensional angular coordinate space by shifting a sensing point in the two-dimensional angular coordinate space with shifting values that depend on the sensor index associated with the sensor that sensed the point of the point cloud.

Figure 9:
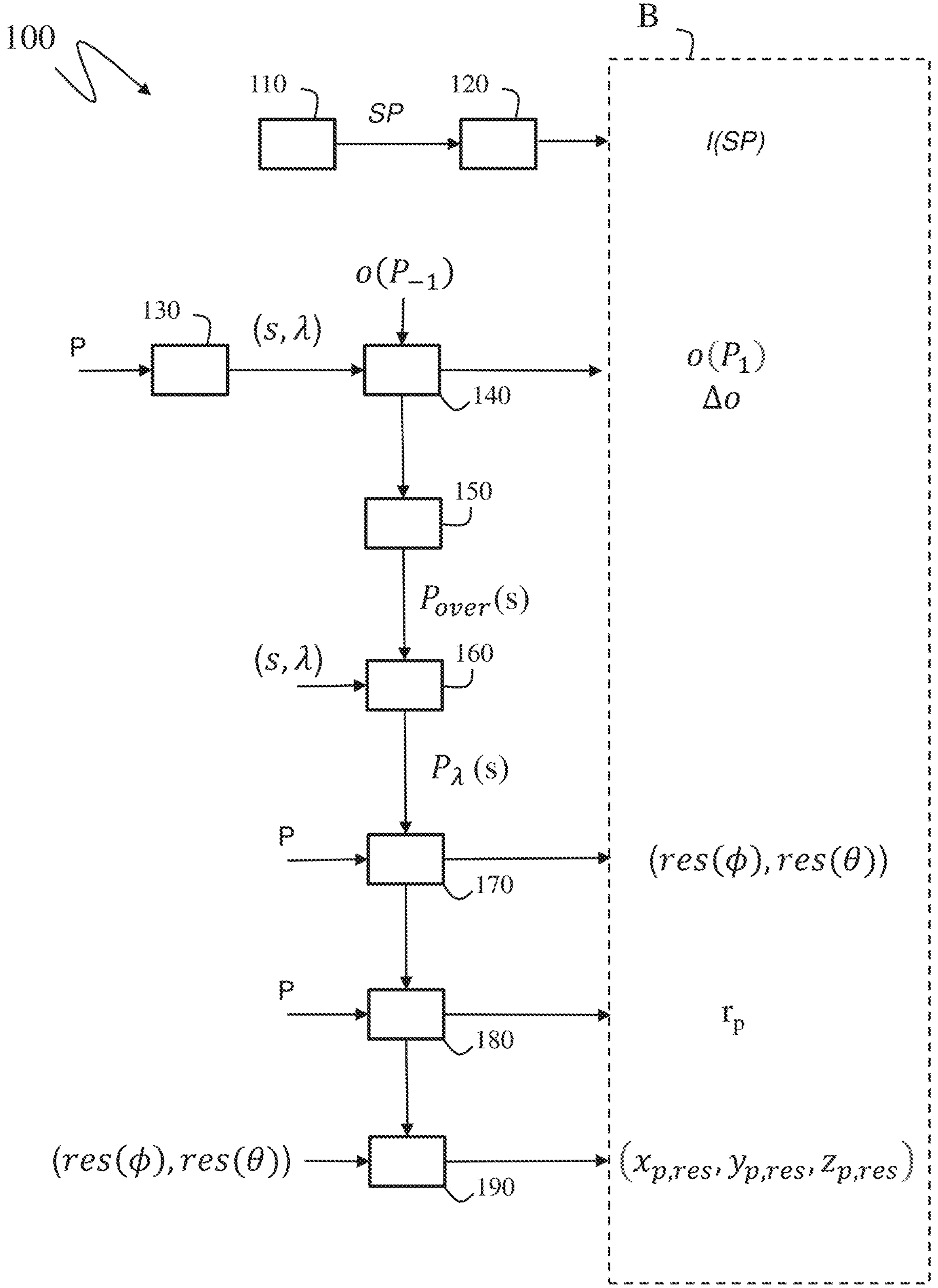
FIG. 9 shows a schematic block diagram of steps of a method 100 of encoding a point cloud into a bitstream of encoded point cloud data in accordance with at least one embodiment.

Shifting the coordinates of a sensing point in a two-dimensional space requires very low computing resources for obtaining a coarse representation of the sensed point of the point cloud. FIG. 9 illustrates a schematic block diagram of steps of a method 100 of encoding a point cloud into a bitstream of encoded point cloud data in accordance with at least one embodiment. Geometry data of the point cloud, i.e. the 3D locations of points of the point cloud, is sensed by any sensor head including a spinning sensors head and/or a single sensor head mimicking multiple sensors.

In step 110, a sensing path SP is represented as a two-dimensional curve defined in a two-dimensional angular coordinate $(\phi,\theta)$ space. The sensing path SP is obtained from sensing characteristics. The two-dimensional angular coordinate $(\phi,\theta)$ space comprises an azimuthal coordinate $\phi$ representative of an azimuthal angle representing a sensing angle of a sensor relative to a referential and an elevation coordinate $\theta$ representative of an elevation angle of a sensor relative to a horizontal referential plane.

Figure 10:
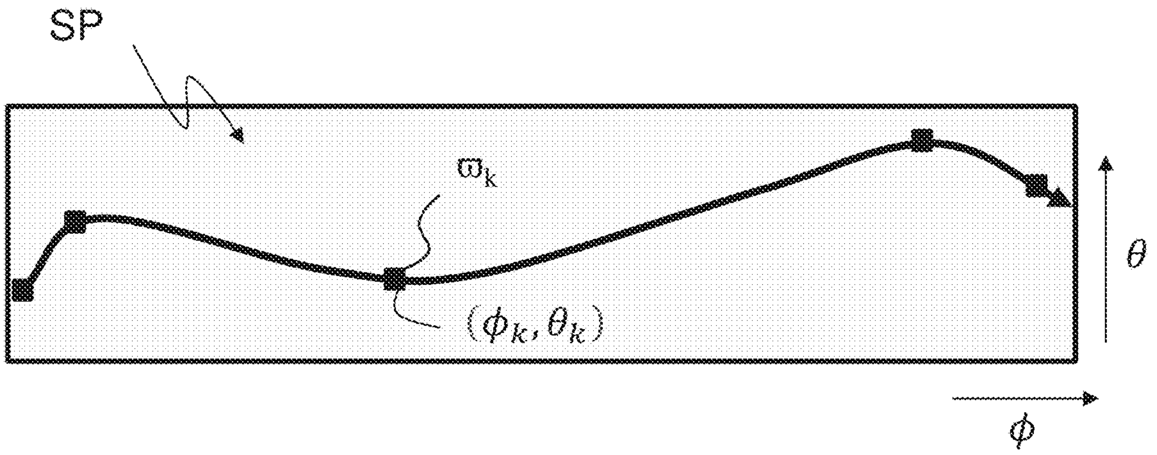
FIG. 10 illustrates schematically a representation of a sensing path SP in accordance with one embodiment.

In one embodiment of step 110, illustrated on FIG. 10, the sensing path SP may be represented by at least one control point $\overline{\omega}_k$ having angular coordinates $(\phi_k,\theta_k)$ in the two-dimensional angular coordinate $(\phi,\theta)$ space. The sensing path SP may then be obtained by interpolation between the control points $\overline{\omega}_k$. For example, a linear interpolation may be used. In another other example, higher order interpolation may be used like third order splines. Any well-known interpolation function may be used.

Control points ok do not need to correspond to some sensing time instant. However, it may be advantageous to have the first control point $\overline{\omega}_0$ being equal to the first sensing time instant as it avoids associating explicitly a sensing time instant with the first control point $\overline{\omega}_0$ and thus avoids coding this sensing time instant.

In one embodiment of step 110, one sensing characteristics imposes that the sensing path SP is closed by an extra interpolation between the last point and the first point of the sensing path SP.

In one embodiment of step 110, one other sensing characteristics imposes that the sensing path SP is a fixed path over which the sensing may loop continuously.

In one embodiment of step 110, one other sensing characteristics imposes that the sensing path SP is a zigzag path covering at least a part of the viewport of a sensor.

The sensing path SP is used to sense the points P of the point cloud according to ordered coarse points $P_\lambda(s)$. A coarse point $P_\lambda(s)$ represents a potential location in the two-dimensional coordinate $(\phi,\theta)$ space of a sensed point P of the point cloud. Each coarse point $P_\lambda(s)$ is defined in the two-dimensional angular coordinate $(\phi,\theta)$ space from one sample index s associated with a sensing time instant along the sensing path SP, and one sensor index $\lambda$ associated with a sensor. A coarse point $P_\lambda(s)$ corresponds to a coarse representation of a potential sensed point of the cloud.

Each sample index s corresponds to a sensing point $P_{over}(s)$ in the two-dimensional angular coordinate $(\phi,\theta)$ space. A sensing point $P_{over}(s)$ is representative of a reference direction that is used to determine the direction (coarse point $P_\lambda(s)$) to which a sensor $\lambda$ of the sensor head is pointing to at a sensing time instant associated with a sample index s. The angular coordinates $(\phi_{over},\theta_{over})$, as a function of the sample index s, of a sensing point $P_{over}(s)$ on the sensing path SP are obtained from a given sensing scheme.

Figure 11:
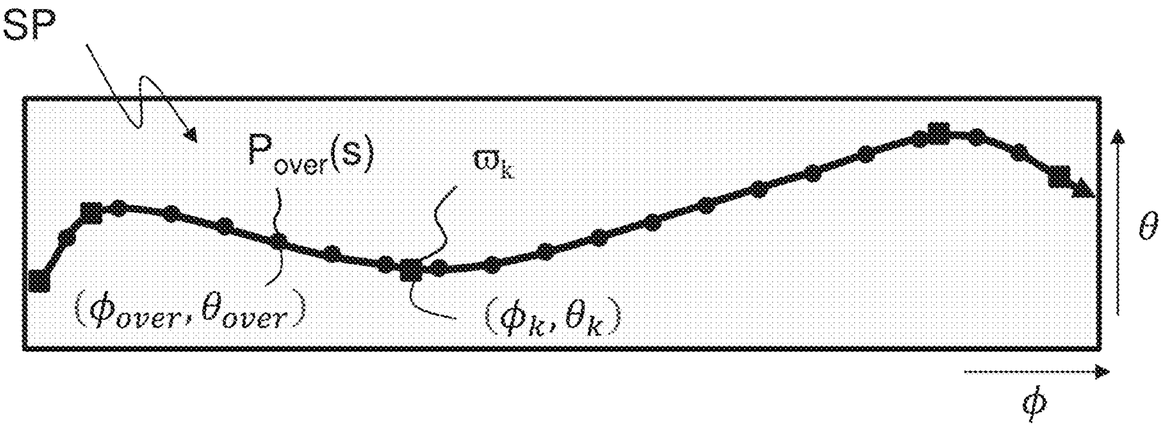
FIG. 11 illustrates schematically a sensing path SP sampled by a sensing scheme in accordance with one embodiment.

In one embodiment of step 110, illustrated on FIG. 11, the sensing scheme may provide a uniform sampling of the sensing path SP, i.e. the sensing points $P_{over}(s)$ are regularly placed, in the two-dimensional angular coordinate $(\phi,\theta)$ space, along the sensing path.

In one embodiment of step 110, the sensing scheme may provide a repartition of the sensing point $P_{over}(s)$ along the sensing path SP to get a uniform sampling of the azimuthal coordinates $\phi$ of said at least one sensing point $P_{over}(s)$.

In one embodiment of step 110, the sensing scheme may provide a repartition of the sensing point $P_{over}(s)$ along the sensing path SP to get a uniform sampling of the elevation coordinates $\theta$ of said at least one sensing point $P_{over}(s)$.

Figure 12:
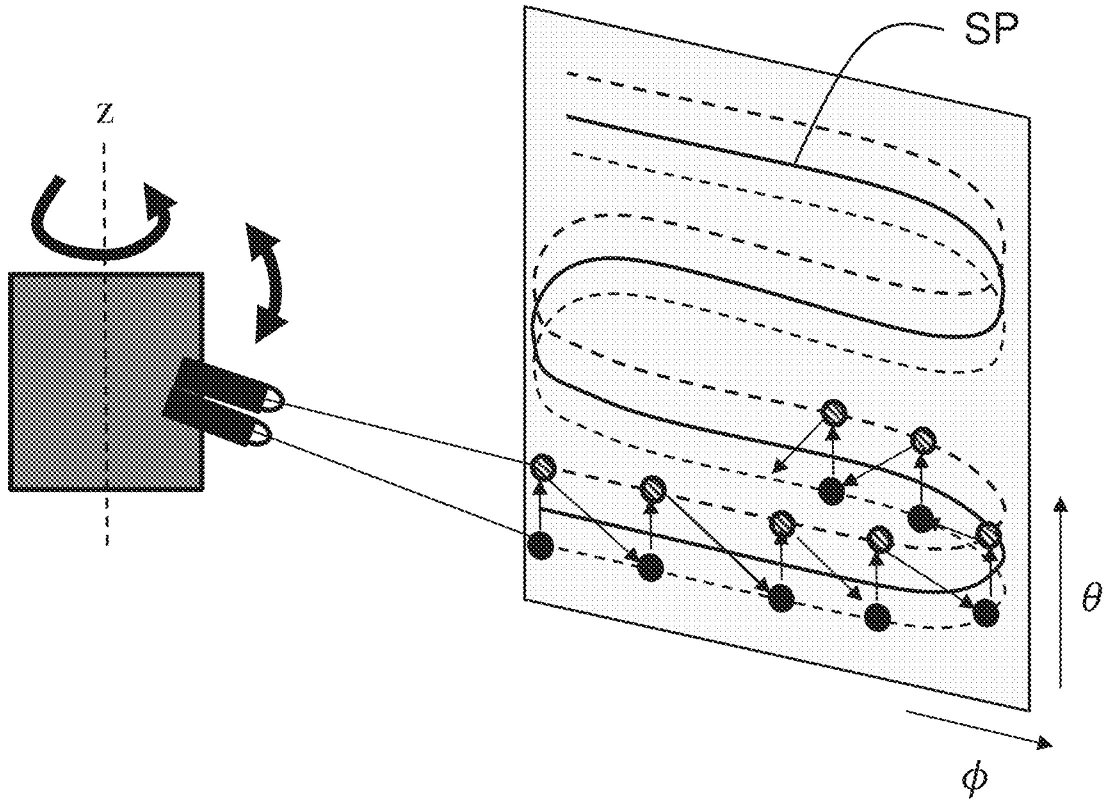
FIG. 12 illustrates schematically an example of an ordering of coarse points in accordance with one embodiment.
Figure 13:
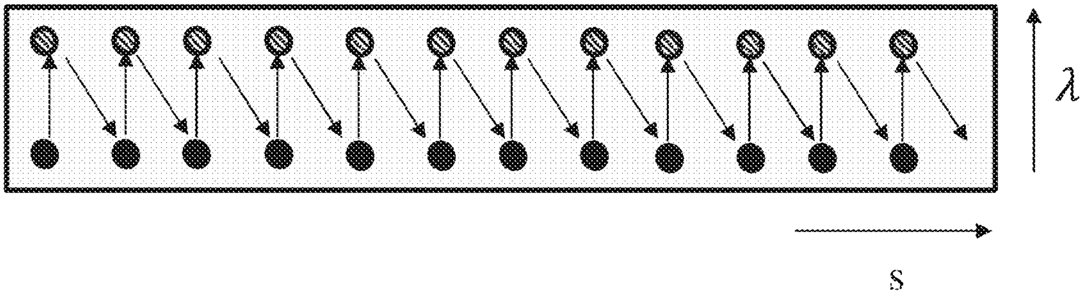
FIG. 13 illustrates schematically a representation of ordered points in a two-dimensional coordinate $(s,\lambda)$ space in accordance with one embodiment.

On the illustrative example of FIG. 12, a sensor head comprising two sensors is used. The sensing paths followed by the two sensors are represented in dash lines. For each sample index s (each sensing time instant), two coarse points are defined. The coarse points associated with the first sensor are represented by black shaded points on FIG. 12 and the coarse points associated with the second sensor are represented by a black hashed point. Each of these two coarse points belongs to a sensor sensing path (dash line) defined from the sensing path SP. FIG. 13 illustrates a representation of ordered coarse points in the two-dimensional coordinate (s,λ) space. Arrows on FIGS. 12 and 13 illustrate the links between two successive ordered coarse points.

An order index o(P) is associated with each coarse point according to the rank of said coarse point among the ordered coarse points.

In one embodiment, the order index o(P) of a coarse point occupied by a sensed point P of the point cloud may be obtained by:

$$o(P) = \lambda + s * K$$

where K is the number of sensors of a set of sensors or the number of different positions of a single sensor for a same sample index, λ is the sensor index of the sensor that sensed the point P of the point cloud at the sensing time instant s.

In step 120, an information I(SP) representing the sensing path SP in the two-dimensional angular coordinate (ϕ,θ) space may be encoded into a bitstream B.

In one embodiment of step 120, the information I(SP) may comprise data representing the angular coordinates $(\phi_k,\theta_k)$ of the control points $\overline{\omega}_k$.

In one embodiment of step 120, the angular coordinates $(\phi_k,\theta_k)$ of the control points $\overline{\omega}_k$ may be encoded directly into the bitstream B.

In one embodiment of step 120, the angular coordinates $(\phi_k,\theta_k)$ of the control points $\overline{\omega}_k$ may be predictive encoded in the bitstream B. Predictive angular coordinates $(\phi_{k,pred},\theta_{k,pred})$ may be obtained from angular coordinates of at least one previously encoded control point $(\phi_{k-m},\theta_{k-m})$, and an angular residual $(\phi_{k,res},\theta_{k,res})$ between the angular coordinates of the control point $(\phi_k,\theta_k)$ and the predicted angular coordinates $(\phi_{k,pred},\theta_{k,pred})$ may be encoded into the bitstream B:

$$(\phi_{k,res}, \theta_{k,res}) = (\phi_k, \theta_k) - (\phi_{k,pred}, \theta_{k,pred})$$

For example, the predicted angular coordinates may be obtained from the angular coordinates of the last encoded control point (m=1):

$$(\phi_{k,pred}, \theta_{k,pred}) = (\phi_{k-1}, \theta_{k-1})$$

In another example, the predicted angular coordinates may be obtained by linearly combining multiple previously encoded control points (m=m1 to m2) where m1 and m2 are two integer values:

$$(\phi_{k,pred}, \theta_{k,pred}) = \sum_{m2}^{m=m1} w_m(\phi_{k-m}, \theta_{k-m})$$

where $w_m$ are weighting coefficients.

In one variant, the coordinates $(\phi_k,\theta_k)$ or the angular residual $(\phi_{k,res},\theta_{k,res})$ may be quantized before encoding.

In one variant, the angular residual $(\phi_{k,res},\theta_{k,res})$ may be further compressed by using an entropy coder like CABAC (Context Adaptive Binary Arithmetic Coding) after binarization of their values.

Any other entropy coder may be used.

In one embodiment of step 120, when the sensing path SP does not vary with time, the information I(SP) may be encoded as an element of a High-Level Syntax (HLS), for example in a Sequence Parameter Set (SPS) that gathers general coding parameters for the point cloud. Then, the coded sensing path may be used for several instances of the point cloud (point cloud frames).

In one embodiment of step 120, when the sensing path SP is frame dependent, the information I(SP) may be encoded as a High-Level Syntax example in a Geometry Parameter Set (GPS) of a current point cloud frame. This requires the determination of the sensing path before coding in the GPS and may lead to some latency up to one frame.

In another embodiment of step 120, the information I(SP) may be encoded into the bitstream B carrying encoded point cloud data.

By doing so, coding on-the-fly the sensing path SP preserves the low latency advantage of the coarse representation as it requires only a local determination of the sensing path before coding.

Referring to FIG. 9, steps 130 to 190 run for each point P of the point cloud sensed by one of a sensor of a sensor head, each point P corresponding to a sensor index λ and sensing time instant s and thus to an occupied coarse point among the ordered coarse points.

A sensed point P of the point cloud may be represented by three-dimensional cartesian coordinates $(x_p, y_p, z_p)$ or three-dimensional spherical coordinates $(r_P,\phi_P,\theta_P)$. Well-known methods in prior art may be used to convert cartesian coordinates to spherical coordinates or inversely.

In step 130, one sample index s associated with a sensing time instant of a point P and one sensor index λ of a sensor that sensed the point P may be obtained.

The sample index s and the sensor index λ are obtained in a straightforward manner during sensing because the sensor index corresponds to the sensor used to sense the point P at a sensing time instant corresponding to the sample index s.

In step 140, one order index difference Δo may be encoded into the bitstream B. The order index difference Δo represents a difference between an order index o(P) of a coarse point identified by the sample index s and the sensor index λ, and an order index $o(P_{-1})$ of another coarse point associated with a previous sensed point $P_{-1}$ of the point cloud:

$$\Delta o = o(P) - o(P_{-1})$$

In one variant, the order index difference Δo may be compressed using an entropy coder like CABAC after binarization of their values.

Any other entropy coder may be used.

In one variant, the order index $o(P_1)$ of the first coarse point occupied by the first sensed point $P_1$ of the point cloud may be directly encoded into the bitstream B. This is equivalent to arbitrary setting the order index of a virtual zero-th point to zero, i.e. $o(P_0)=0$, and coding $\Delta o_1=o(P_1)-o(P_0)=o(P_1)$.

Given the order index $o(P_1)$ of the first coarse point occupied by the first sensed point $P_1$ of the point cloud, and order differences $\Delta o$, one can recursively reconstruct the order index $o(P)$ of any coarse point occupied by a sensed point P of the point cloud by:

$$o(P) = o(P_{-1}) + \Delta o$$

Figure 14:
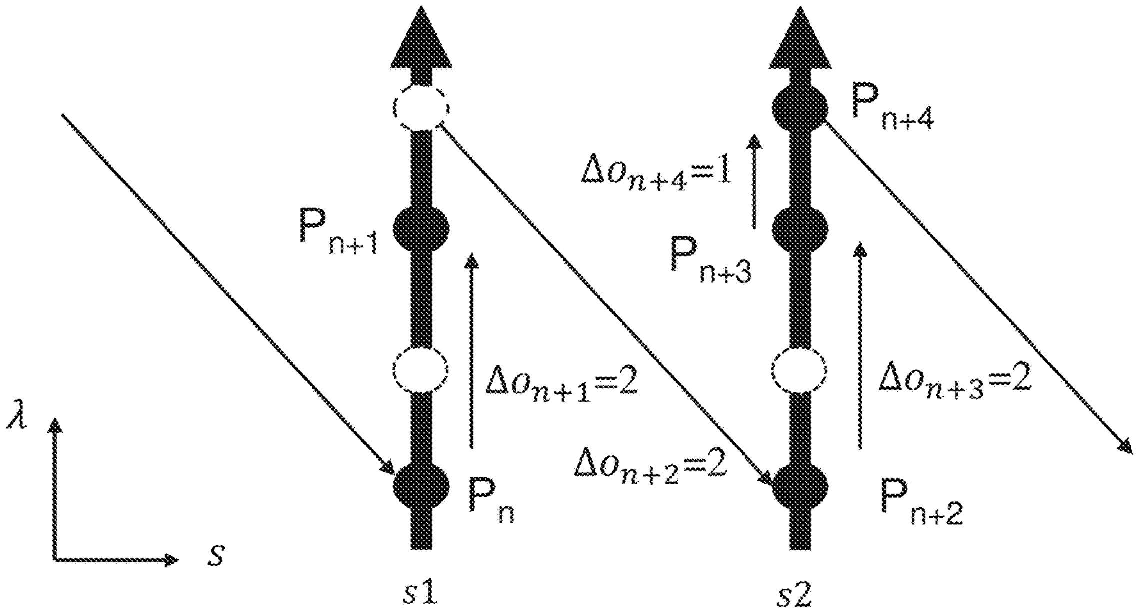
FIG. 14 illustrates schematically calculating of order index differences in accordance with one embodiment.

On FIG. 14, five occupied coarse points are represented (black circles): two coarse points $P_n$ and $P_{n+1}$ are occupied by two points of the point cloud sensed at a sensing time instant $t_1$ (corresponding to a sample index $s_1$) and three coarse points are occupied by three points of the point cloud sensed at a sensing time instant $t_2$ (corresponding to a sample index $s_2$). Assuming the coordinates of the first occupied coarse point $P_n$ in the two-dimensional coordinate $(s,\lambda)$ space are known beforehand, a first order index difference $\Delta o_{n+1}$ is obtained as a difference between the order index $o(P_{n+1})$ of the occupied coarse point $P_{n+1}$ and the order index $o(P_n)$ of the occupied coarse point $P_n$. In the example $\Delta o_{n+1}=2$ because a coarse point is not occupied (white circle). A second order index difference $\Delta o_{n+2}$ is obtained as a difference between the order index $o(P_{n+2})$ of another occupied coarse point $P_{n+2}$ and the order index $o(P_{n+1})$ of the occupied coarse point $P_{n+1}$, and so on.

In step 150, one sensing point $P_{over}(s)$ in the two-dimensional angular coordinate $(\phi,\theta)$ space may be obtained from the sample index s according to the sensing scheme as above explained.

For example, the sensing scheme may inform that sensing is performed uniformly along the sensing path, such that the sensing $P_{over}(s)$ is located at a distance (taking along the sensing path SP) proportional to the sample index s from some origin of the sensing path SP.

In step 160, a coarse point $P_\lambda(s)$ in the two-dimensional angular coordinate space may be obtained by shifting the sensing point $P_{over}(s)$ in the two-dimensional angular coordinate $(\phi,\theta)$ space:

$$P_\lambda(s) = P_{over}(s) + \delta P$$

where $\delta P$ is a shifting vector for the sensing point $P_{over}(s)$ that depends on the sensor index $\lambda$ associated with the sensor that sensed the point P of the point cloud.

The obtained coarse point $P_\lambda(s)$ is associated with the point P of the point cloud sensed by a sensor having a sensor index $\lambda$ at a sensing time instant associated with the sample index s.

Figure 15:
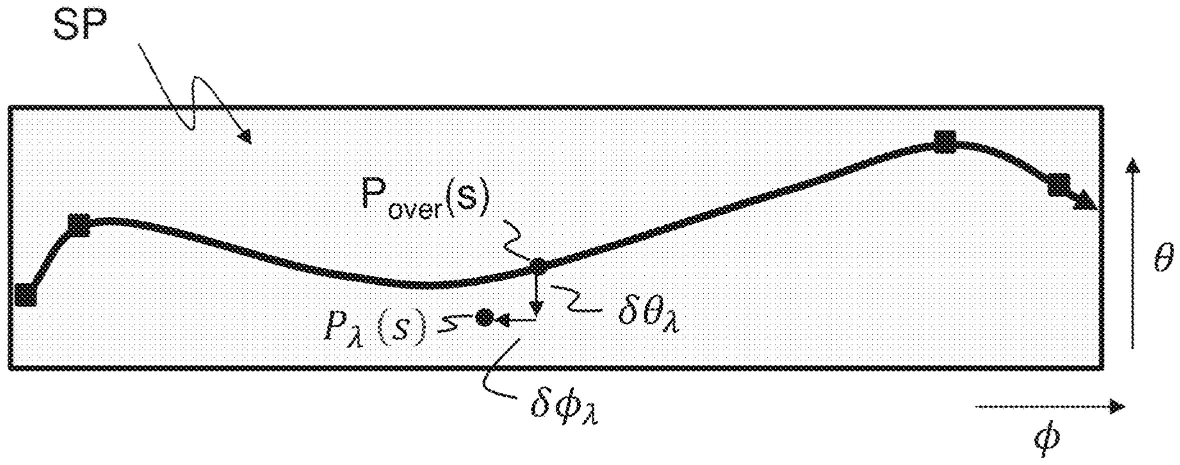
FIG. 15 illustrates schematically obtaining of a coarse point from a sensing point in accordance with one embodiment.

In one embodiment of step 160, illustrated on FIG. 15, the angular coordinates $(\phi_\lambda,\theta_\lambda)$ of the coarse point $P_\lambda(s)$ may be obtained by shifting the angular coordinates of the sensing point $P_{over}(s)$ in the two-dimensional angular coordinate $(\phi,\theta)$ space by an azimuthal angle shifting coefficient $\delta\phi_\lambda$ and an elevation angle shifting coefficient $\delta\theta_\lambda$, both depending on the sensor index $\lambda$:

$$(\phi_\lambda, \theta_\lambda) = (\phi_{over}, \theta_{over}) + (\delta\phi_\lambda, \delta\theta_\lambda)$$

The angular coordinates $(\phi_\lambda,\theta_\lambda)$ of the coarse point $P_\lambda(s)$ depend on the angular coordinates $(\phi_{over},\theta_{over})$ of the sensing point $P_{over}(s)$, and depend on the intrinsic geometry of the sensor head.

In one variant, the azimuthal angle shifting coefficients $\delta\theta_\lambda$ and the elevation angle shifting coefficients $\delta\theta_\lambda$ are known by the decoder beforehand.

In one variant, an azimuthal angle shifting coefficient $\delta\theta_\lambda$ and an elevation angle shifting coefficient $\delta\theta_\lambda$ may be encoded into the bitstream B for the sensor index $\lambda$ and do not depend on the sample index s.

In one embodiment of this variant, azimuthal angle shifting coefficients $\delta\theta_\lambda$ and elevation angle shifting coefficients $\delta\theta_\lambda$ may be encoded in High-Level Syntax (HLS) elements such as Sequence Parameter Set (SPS) and/or Geometry Parameter Set (GPS).

In one embodiment of this variant, the azimuthal angle shifting coefficient $\delta\theta_\lambda$ and elevation angle shifting coefficient $\delta\theta_\lambda$ may be encoded relatively to a previously encoded azimuthal angle shifting coefficient $\delta\phi_{\lambda'}$ and a previously encoded elevation angle shifting coefficient $\delta\theta_{\lambda'}$ corresponding to another sensor index $\lambda'$. The following residual may then be encoded into the bitstream B:

$$(\delta\phi_\lambda,\delta\theta_\lambda)-(\delta\phi_{\lambda'},\delta\theta_{\lambda'})$$

In another embodiment of this variant, the azimuthal angle shifting coefficient $\delta\phi_\lambda$ and elevation angle shifting coefficient $\delta\theta_\lambda$ may be encoded relatively to two previously encoded azimuthal angle shifting coefficients $\delta\phi_{\lambda'}$ and $\delta\phi_{\lambda''}$, and to two previously encoded elevation angle shifting coefficients $\delta\theta_{\lambda'}$ and $\delta\theta_{\lambda''}$ corresponding to two different sensor indices $\lambda'$ and $\lambda''$. The following residual may then be encoded into the bitstream B:

$$(\delta\phi_\lambda, \delta\theta_\lambda) - 2 * (\delta\phi_{\lambda'}, \delta\theta_{\lambda'}) + (\delta\phi_{\lambda''}, \delta\theta_{\lambda''})$$

In yet another embodiment of this variant, the azimuthal angle shifting coefficient $\delta\theta_\lambda$ and elevation angle shifting coefficient $\delta\theta_\lambda$ may be encoded relatively to a weighted average of previously encoded azimuthal angle shifting coefficients and to a weighted average of previously encoded elevation angle shifting coefficients.

In another variant, an azimuthal angle shifting coefficient $\delta\phi_\lambda$ and an elevation angle shifting coefficient $\Delta\theta_\lambda$ depend on the sample index s and may be encoded into the bitstream B for each coarse point $P_\lambda(s)$.

In one embodiment of this variant, the azimuthal angle shifting coefficient $\delta\phi_\lambda(s)$ and elevation angle shifting coefficient $\delta\theta_\lambda(s)$ corresponding to a coarse point Pa(s) may be encoded relatively to at least one previously encoded azimuthal angle shifting coefficient and at least one previously encoded elevation angle shifting coefficient corresponding to at least one coarse point.

In another embodiment of this variant, the azimuthal angle shifting coefficient $\delta\phi_\lambda(s)$ and elevation angle shifting coefficient $\delta\theta_\lambda(s)$ corresponding to a coarse point $P_\lambda(s)$ may be encoded relatively to the previously encoded azimuthal angle shifting coefficient $\delta\phi_\lambda(s-n)$ and the previously encoded elevation angle shifting coefficient $\delta\theta_\lambda(s-n)$ corresponding to the latest coarse point $P_\lambda(s-n)$ for which a point of the point cloud has been encoded with the sensor index $\lambda$. The following residual may then be encoded into the bitstream B:

$$(\delta\phi_\lambda(s), \delta\theta_\lambda(s)) - (\delta\phi_\lambda(s-n), \delta\theta_\lambda(s-n))$$

In another embodiment of this variant, the azimuthal angle shifting coefficient $\delta\phi_\lambda(s)$ and elevation angle shifting coefficient $\delta\theta_\lambda(s)$ corresponding to a coarse point $P_\lambda(s)$ may be encoded relatively to a weighted linear combination of azimuthal angle shifting coefficients and/or a weighted linear combination of elevation angle shifting coefficients corresponding to multiple previously encoded coarse points for which multiple points of the point cloud have been encoded with the sensor index λ.

In yet another embodiment of this variant, the weighted linear combination may combine the azimuthal angle shifting coefficient $\delta\phi_\lambda(s-n)$ and the elevation angle shifting coefficient $\delta\theta_\lambda(s-n)$ corresponding to the latest coarse point $P_\lambda(s-n)$, and the azimuthal angle shifting coefficient $\delta\phi_\lambda(s-m)$ and the elevation angle shifting coefficient $\delta\theta_\lambda(s-m)$ corresponding to the previous latest coarse point $P_\lambda(s-m)$.

For example, the following residual may be encoded into the bitstream B:

$$(\delta\phi_\lambda(s), \delta\theta_\lambda(s)) - 2*(\delta\phi_\lambda(s-n), \delta\theta_\lambda(s-n)) + (\delta\phi_\lambda(s-m), \delta\theta_\lambda(s-m))$$

where 's-n' is the latest sample index for which a point has been coded with sensor index λ, and 's-m' is the penultimate sample index for which a point has been coded with sensor index 'λ'.

Figure 16:
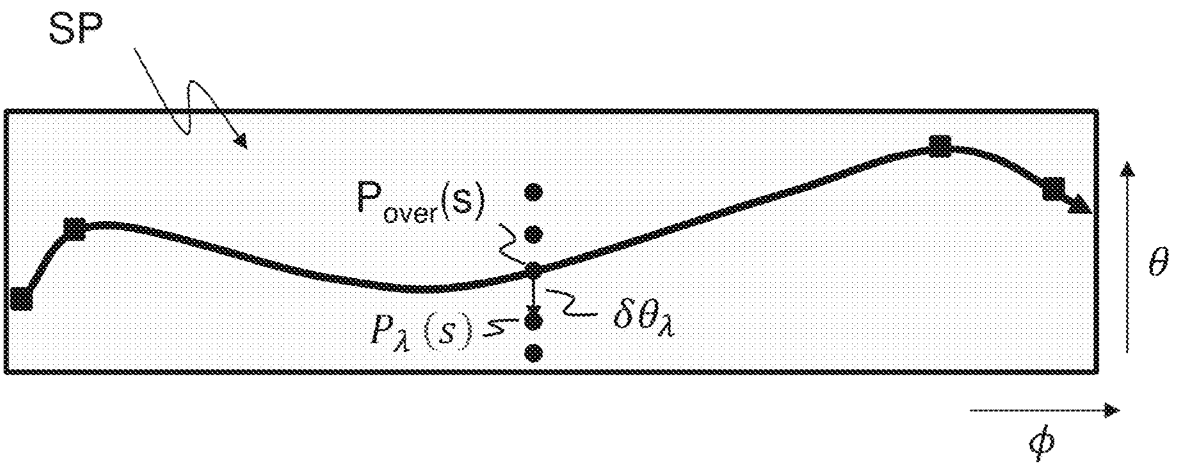
FIG. 16 illustrates schematically obtaining of a coarse point from a sensing point in accordance with one embodiment.
Figure 17:
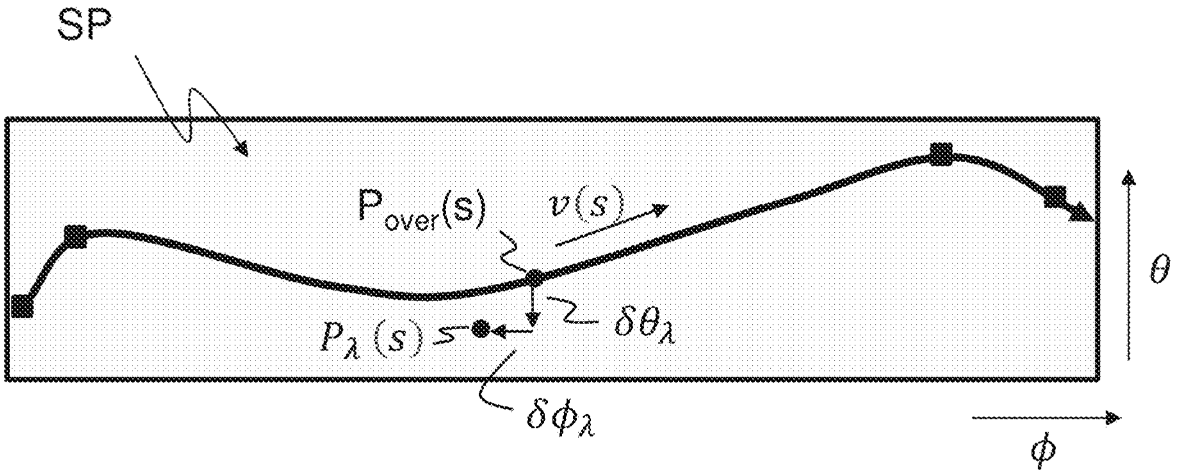
FIG. 17 illustrates schematically obtaining of a coarse point from a sensing point in accordance with one embodiment.

In one variant, illustrated on FIG. 16, when the sensors of a sensor head are vertically arranged, the azimuthal angle shifting coefficients $\delta\phi_\lambda$ may equal zero and the angular coordinates $(\phi_\lambda,\theta_\lambda)$ of the coarse point $P_\lambda(s)$ may be obtained by:

$$(\phi_\lambda, \theta_\lambda) = (\phi_{over}, \theta_{over}) + (0, \delta\theta_\lambda)$$

In one variant, the sum of the azimuthal angle shifting coefficients $\delta\phi_\lambda$ equals 0 and the sum of elevation angle shifting coefficients $\delta\theta_\lambda$ equals 0:

$$\sum_\lambda \delta\phi_\lambda = 0 \text{ and}$$

$$\sum_\lambda \delta\theta_\lambda = 0$$

This variant is advantageous because coding of an azimuthal angle shifting coefficients $\delta\phi_\lambda$ and an elevation angle shifting coefficients $\delta\theta_\lambda$ into the bitstream B may be avoided as they can be deduced from other coded coefficients. For example, the azimuthal angle shifting coefficient $\delta\phi_\lambda$ and the elevation angle shifting coefficients $\delta\theta_\lambda$ associated with the first or the last sensor of a sensor head may be omitted into the bitstream B.

In one variant, the sensing path SP corresponds to the sensing trajectory of a particular sensor $\lambda_{ref}$ of reference such that one has $P_{\lambda ref}(s)=P_{over}(s)$ and $$(\delta\phi_{\lambda ref}, \delta\theta_{\lambda ref})=(0,0)$$

This variant is advantageous because it does not need coding of the azimuthal angle shifting coefficients $\delta\phi_{\lambda ref}$ and the elevation angle shifting coefficients $\delta\theta_{\lambda ref}$ for the sensor $\lambda_{ref}$ of reference.

Typically, all sensors of a sensor head do not sense a real scene at the same sensing time instant. For example, a sensor having a sensor index λ may sense the scene at time $t_s+\Delta t_\lambda$ where $t_s$ is a sensing time instant associated with a sample index s. Therefore, the 2D angular velocity $\nu(s)=\nu(t_s)$ of a sensing point $P_{over}(s)=P_{over}(t_s)$ may not be neglected in the determination of the coarse point $P_\lambda(s)$ that is not sensed at time $t_s+\Delta t_\lambda$.

In one embodiment of step 160, with a first order temporal approximation, the angular coordinates $(\phi_\lambda,\theta_\lambda)$ of the coarse point $P_\lambda(s)$ may be obtained by further shifting the angular coordinates of the sensing point $P_{over}(s)$ in the two-dimensional angular coordinate $(\phi,\theta)$ space by an offset depending on a sensing delay $\Delta t_\lambda$ and a2D angular velocity $\nu(s)$ of the sensing point $P_{over}(s)$:

$$(\phi_\lambda, \theta_\lambda) = (\phi_{over}, \theta_{over}) + (\delta\phi_\lambda, \delta\theta_\lambda) + \Delta t_\lambda * \nu(s)$$

This variant improves the determination of the coarse point $P_\lambda(s)$ by correcting the angular coordinates of the coarse point $P_\lambda(s)$ according to the 2D angular velocity of the sensing point $P_{over}(S)$.

This variant is particularly adapted to spinning sensor head such as Lidar sensor head using a vertically rotating mirror to adjust the sensing elevation angle.

In one variant, the velocity $\nu(s)$ of a sensing point $P_{over}(s)$ may be obtained from an angular distance of this sensing points and a previous sensing point $P_{over}(t_{s-1})$ by.

$$\nu(t_s) = (P_{over}(t_s) - P_{over}(t_{s-1}))/(t_s - t_{s-1})$$

In one variant, the velocity $\nu(s)$ of a sensing point $P_{over}(s)$ may be obtained from an angular distance between a first control point $\varpi_k$ associated with a sensing time instant lower than the sensing time instant associated with the sensing point $P_{over}(s)$, and a second control point $\varpi_{k-1}$ associated with a sensing time instant greater than the sensing time instant associated with the sensing point $P_{over}(s)$ by:

$$\nu(t_s) = (\varpi_k - \varpi_{k-1})/(t_k - t_{k-1})$$

where $t_k$ is a sensing time instant associated with the control point $\varpi_k$ and $t_{k+1}$ is a sensing time instant associated with the control point $\varpi_{k+1}$ and $t_s \in [t_{k-1}, t_k]$.

In one variant, the sensing delays $\Delta t_\lambda$ may be fixed (depend on sensor characteristics).

In one variant, the sensing delays $\Delta t_\lambda$ may be encoded into the bitstream B.

With some spinning sensor head, such as a Lidar sensor head using a vertically rotating mirror to adjust the sensing elevation angle, elevation angle shifting coefficient $\delta\theta_\lambda$ may oscillate between a minimum elevation angle shifting coefficient $\delta\theta_{min}$, and a maximum elevation angle shifting coefficient $\delta\theta_{max}$, and so with a fixed oscillation amplitude $\delta\theta_{max}-\delta\theta_{min}$.

In some other systems the oscillation amplitude may also vary with time.

In one embodiment of step 160, in order to handle data coming from such spinning sensor head, the elevation angle shifting coefficient $\delta\theta_\lambda$ is multiplied by an amplitude coefficient factor $\alpha(s)$:

$$(\phi_\lambda, \theta_\lambda) = (\phi_{over}, \theta_{over}) + (\delta\phi_\lambda, \alpha(s) * \delta\theta_\lambda)$$

Combining different embodiments together, the angular coordinates $(\phi_\lambda,\theta_\lambda)$ of the coarse point $P_\lambda(s)$ may be obtained by:

$$(\phi_\lambda, \theta_\lambda) = (\phi_{over}, \theta_{over}) + (\delta\phi_\lambda, \alpha(s) * \delta\theta_\lambda) + \Delta t_\lambda * v(s)$$

In on variant, the amplitude coefficient factor $\alpha(s)$ is encoded in the bitstream B as an element of a High-Level Syntax (HLS), for example in a header of such element.

In on variant, the amplitude coefficient factor $\alpha(s)$ is directly encoded in the bitstream B if the oscillations amplitude is interactively/dynamically changing during the point cloud sensing.

In step 170, the point P may be encoded into the bitstream B relatively to the coarse point $P_\lambda(s)$.

In one embodiment of step 170, encoding the point P relatively to the coarse point $P_\lambda(s)$ may comprise encoding an angular residual $(res(\phi), res(\theta))$ based on angular coordinates $(\phi_P,\theta_P)$ of the point P and angular coordinates $(\phi_\lambda,\theta_\lambda)$ of the coarse point $P_\lambda(s)$:

$$(res(\phi), res(\theta)) = (\phi_P, \theta_P) - (\phi_\lambda, \theta_\lambda)$$

Optionally, the method 100 may further comprise in step 180, encoding, in the bitstream B, the radius value $r_p$ of spherical or cylindrical coordinates of the point P. A reconstructed radius value $r_{p,rec}$ may be obtained by decoding the encoded radius value $r_p$.

In one embodiment of step 180, the radius value $r_p$ may be quantized and the reconstructed radius value $r_{p,rec}$ may be obtained by inverse quantizing the quantized radius value $Q1(r_p)$. For example, Q1 is a uniform quantizer using a quantization step $\Delta 1$:

$$Q1(r_p) = \text{round}\left(\frac{r_p}{\Delta 1}\right)$$

The reconstructed radius value $r_{p,rec}$ is then obtained by inverse quantizing the quantized radius value $Q1(r_p)$ by an inverse quantizer IQ1:

$$IQ1(Q1(r_p)) = Q1(r_p) * \Delta 1$$

Any other quantizer and inverse quantizer may be used.

In an embodiment of step 180, the radius value $r_p$ may be quantized and coded, and the reconstructed radius value $r_{p,rec}$ is obtained by decoding and inverse quantizing the coded radius value $r_p$.

In one variant, the quantized radius value $r_p$ may be entropy encoded using an entropy coder like CABAC after binarization of their values.

Any other entropy coder may be used.

In one embodiment of step 180, the radius value $r_p$ may represent a three-dimensional radius $r_{3D}$.

Figure 4:
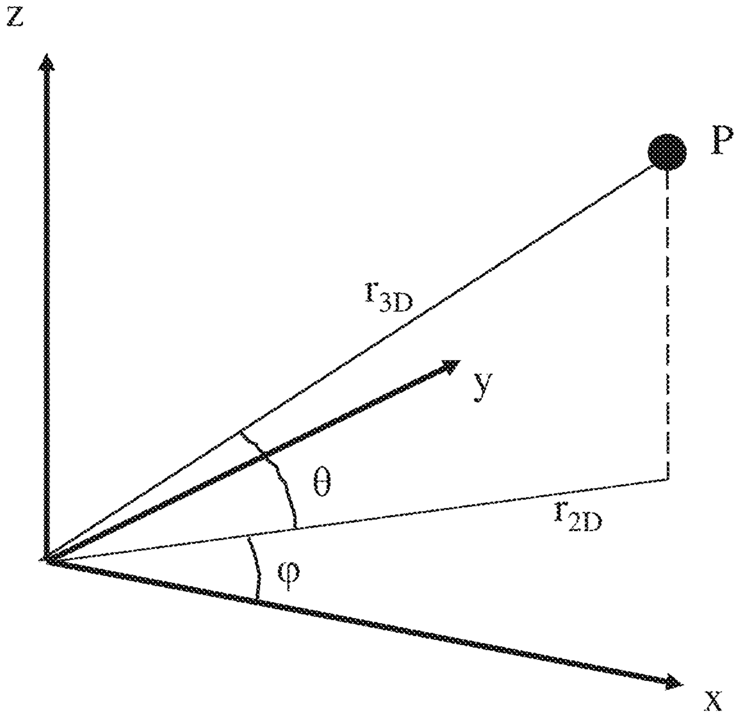
Fig. 4 (Prior Art)
FIG. 4 shows a representation of a point of a point cloud in a 3D space in accordance with prior art.
Figure 5:
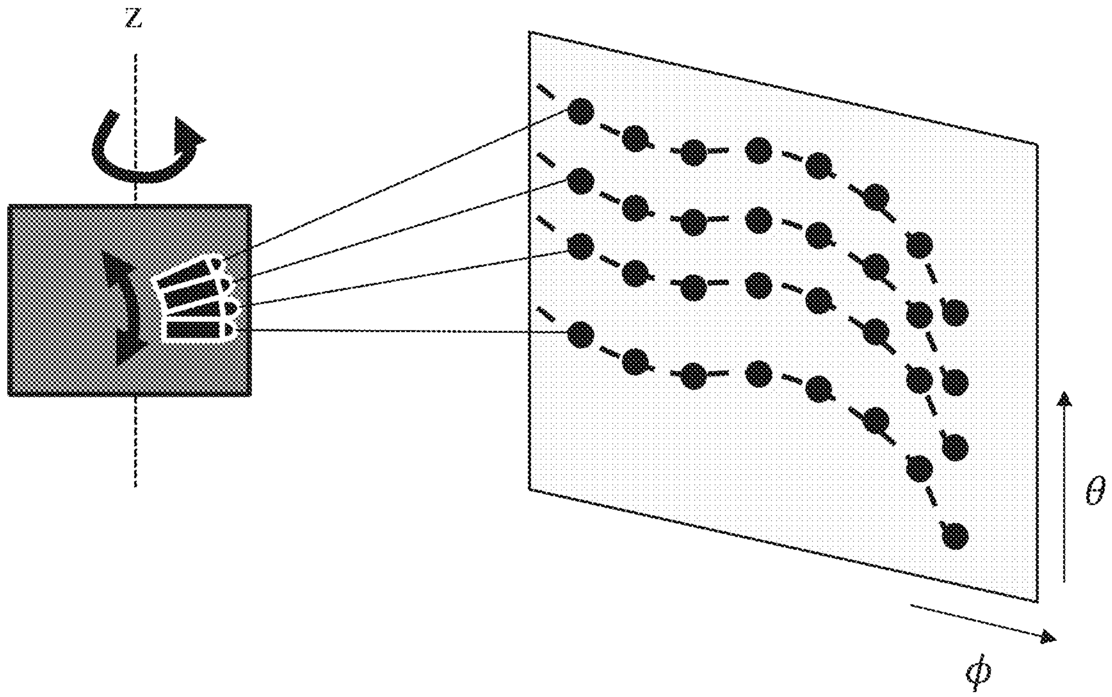
Fig. 5 (Prior Art)
FIG. 5 shows schematically an example of a sensor head able to sense a real scene following a programmable sensing path in accordance with prior art.
Figure 6:
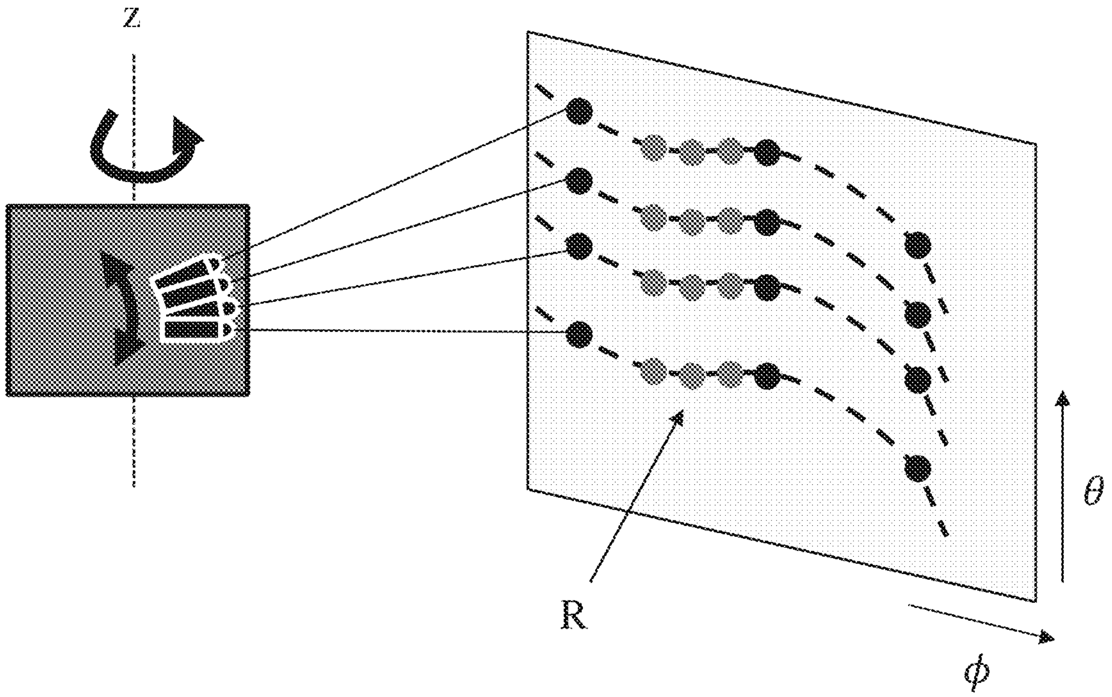
Fig. 6 (Prior Art)
FIG. 6 shows schematically an example of a sensor head able to sense a real scene following a programmable sensing path according to different sensing frequencies in accordance with prior art.
Figure 7:
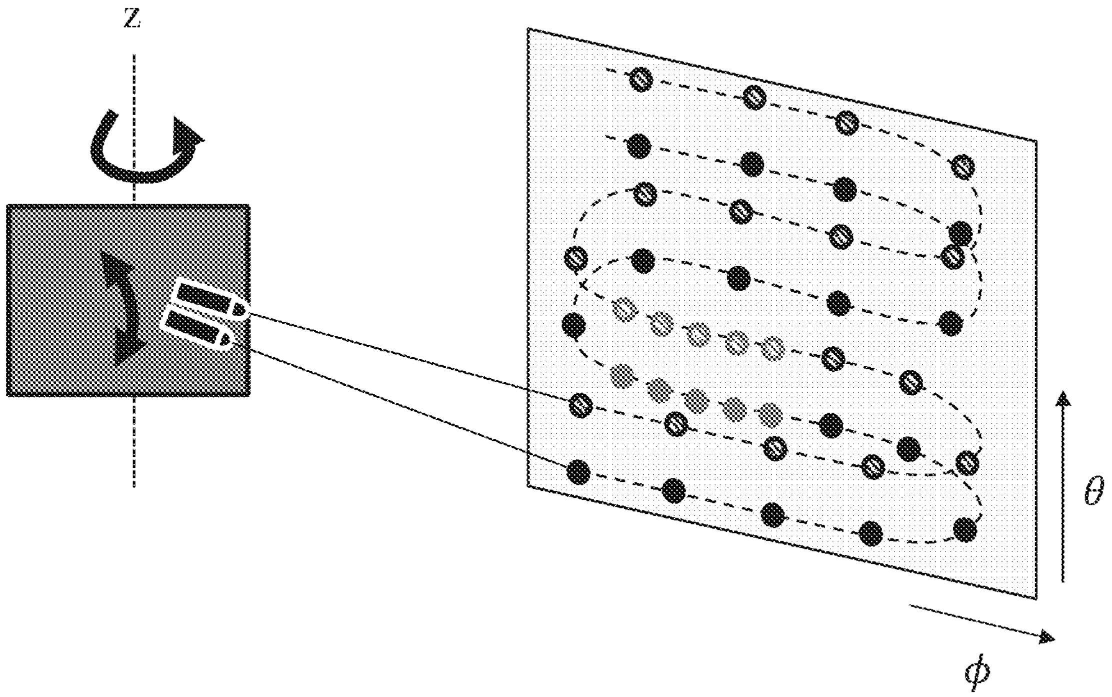
Fig. 7 (Prior Art)
FIG. 7 shows schematically an example of a sensor head able to sense a real scene following a programmable zigzag sensing path according to different sensing frequencies in accordance with prior art.
Figure 8:
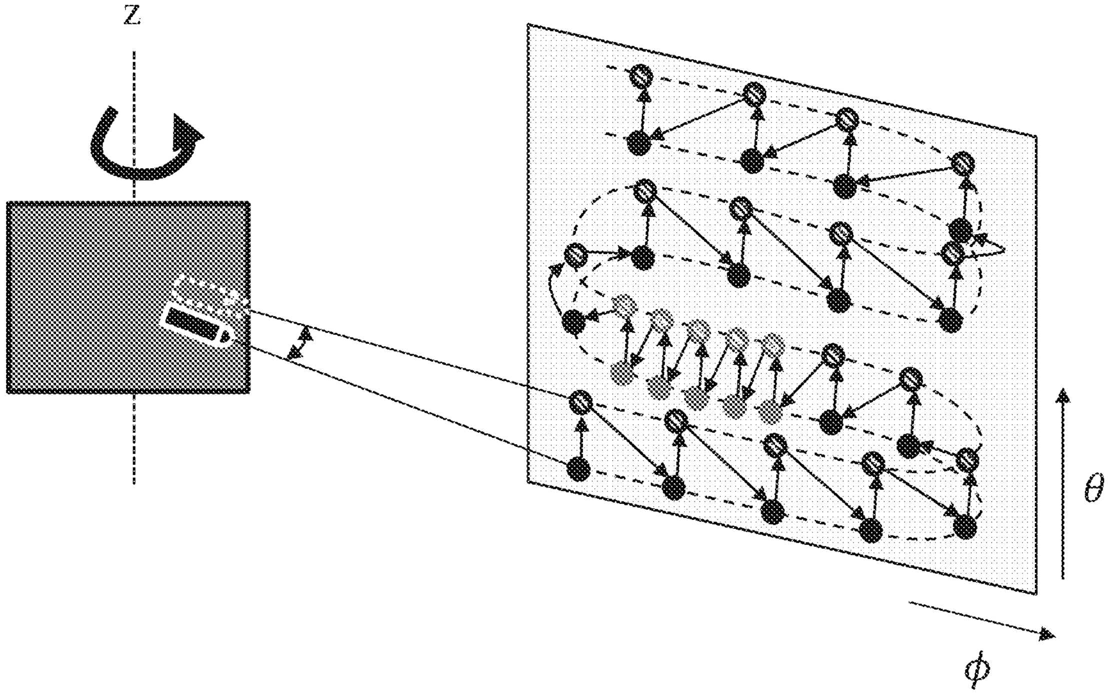
Fig. 8 (Prior Art)
FIG. 8 shows schematically a single sensor head able to sense a real scene following a programmable zigzag sensing path according to different sensing frequencies in accordance with prior art.

In one embodiment of step 180, the radius value $r_p$ may represent the projected radius $r_{2D}$ on the horizontal xy plane as depicted on FIG. 4.

In one embodiment, the method 100 may further comprise, in step 190, encoding, into the bitstream B, a cartesian coordinate residual $(x_{p,res}, y_{p,res}, z_{p,res})$ for the point P based on the cartesian coordinates of the point P and cartesian coordinates $(x_{p,rec}, y_{p,rec}, z_{p,rec})$ of a reconstructed point $P_{rec}$ obtained from the coarse point $P_\lambda(s)$, the angular residual $(res(\phi), res(\theta))$ and the reconstructed radius value $r_{p,rec}$.

First, angular coordinates $(\phi_{rec},\theta_{rec})$ of the reconstructed point $P_{rec}$ are obtained by adding the angular coordinates $(\phi_\lambda,\theta_\lambda)$ of the coarse point $P_\lambda(s)$ and the angular residual $(res(\phi),res(\theta))$:

$$(\phi_{rec}, \theta_{rec}) = (\phi_\lambda, \theta_\lambda) + (res(\phi), res(\theta)) \tag{1}$$

Next, cartesian coordinates $(x_{p,rec}, y_{p,rec}, z_{p,rec})$ of the reconstructed point $P_{rec}$ are obtained from the angular coordinates $(\phi_{rec},\theta_{rec})$ of the reconstructed point $P_{rec}$ and the radius value $r_{p,rec}$:

$$\begin{cases} x_{p,rec} = r_{p,rec} * \cos(\phi_{rec}) \\ y_{p,rec} = r_{p,rec} * \sin(\phi_{rec}) \\ z_{p,rec} = r_{p,rec} * \tan(\phi_{rec}) \end{cases} \tag{2}$$

Finally, the cartesian coordinate residual $(x_{p,res}, y_{p,res}, z_{p,res})$ is obtained based on the cartesian coordinates $(x_p, y_p, z_p)$ of the point P and the cartesian coordinates $(x_{p,rec}, y_{p,rec}, z_{p,rec})$ of the reconstructed point $P_{rec}$:

$$(x_{p,res}, y_{p,res}, z_{p,res}) = (x_p, y_p, z_p) - (x_{p,res}, y_{p,res}, z_{p,res}) \tag{3}$$

In one variant, a quantized cartesian coordinate residual $Q2(x_{p,res}, y_{p,res}, z_{p,res})$ may be obtained by quantizing the cartesian coordinate residual $(x_{p,res}, y_{p,res}, z_{p,res})$ and the quantized cartesian coordinate residual $Q2(x_{p,res}, y_{p,res}, z_{p,res})$ is encoded.

For example, Q2 is a uniform quantizer using a quantization step $\Delta 2$:

$$Q2(x_{p,res}, y_{p,res}, z_{p,res}) = \text{round}\left(\frac{(x_{p,res}, y_{p,res}, z_{p,res})}{\Delta 2}\right)$$

The cartesian coordinate residual $(x_{p,res}, y_{p,res}, z_{p,res})$ may be obtained by inverse quantizing the quantized cartesian coordinate residual $Q2(x_{p,res}, y_{p,res}, z_{p,res})$ by:

$$IQ2(Q2(x_{p,res}, y_{p,res}, z_{p,res})) = Q2(x_{p,res}, y_{p,res}, z_{p,res}) * \Delta 2$$

Any other quantizer and inverse quantizer may be used.

In one variant, the quantized cartesian coordinate residual $Q2(x_{p,res}, y_{p,res}, z_{p,res})$ may be entropy encoded using an entropy coder like CABAC after binarization of their values.

Any other entropy coder may be used.

In one variant, a quantized angular residual $Q3(res(\phi), res(\theta))$ may be obtained by quantizing the angular residual $(res(\phi), res(\theta))$ and the quantized angular residual $Q3(res(\phi),res(\theta))$ is encoded.

Angular coordinates of the reconstructed point $P_{rec}$ (equation 1) are then obtained by:

$$(\phi_{rec}, \theta_{rec}) = (\phi_\lambda, \theta_\lambda) + IQ3(Q3(res(\phi), res(\theta)))$$

For example, Q3 is a uniform quantizer using a quantization step Δ3:

$$Q3((res(\phi), res(\theta))) = \text{round}\left(\frac{(res(\phi), res(\theta))}{\Delta 3}\right)$$

And IQ3 is the inverse quantizer:

$$IQ3(Q3(res(\phi), res(\theta))) = Q3(res(\phi), res(\theta)) * \Delta 3$$

Any other quantizer and inverse quantizer may be used.

In one variant, the quantized angular residual Q3(res(ϕ), res(θ)) may be entropy encoded using an entropy coder like CABAC after binarization of their values.

Any other entropy encoder may be used.

Figure 18:
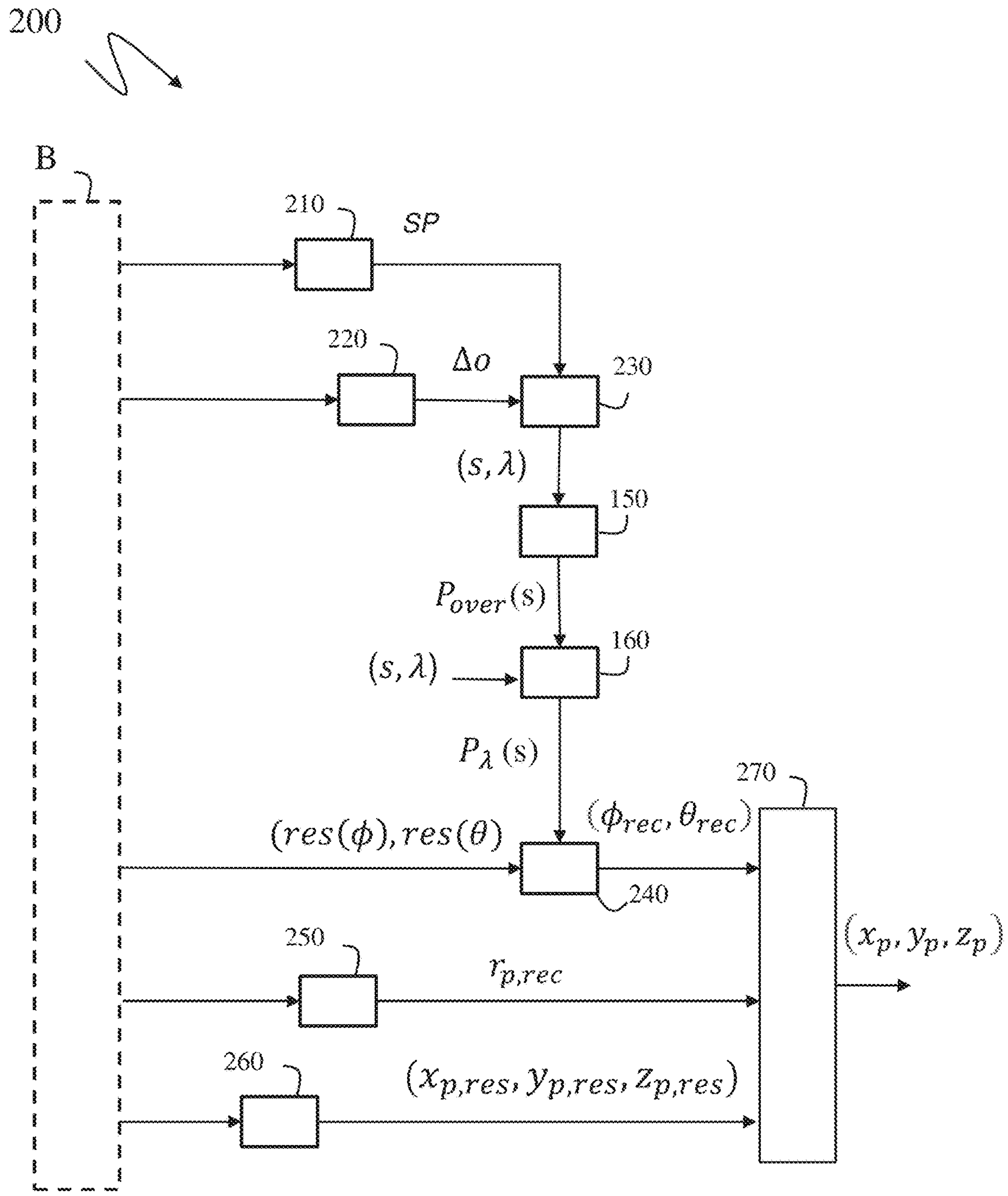
FIG. 18 illustrates a schematic block diagram of steps of a method 200 of decoding a point cloud from a bitstream of encoded point cloud data in accordance with at least one embodiment.

FIG. 18 illustrates a schematic block diagram of steps of a method 200 of decoding a point cloud from a bitstream of encoded point cloud data in accordance with at least one embodiment. Decoding points of a point cloud from a bitstream B requires information such as a number N of points of the point cloud. This information may be decoded from the bitstream B or received by any other means or may be known beforehand by a decoder.

In step 210, the information I(SP) may be decoded from a bitstream.

In one embodiment of step 210, the angular coordinates $(\phi_k,\theta_k)$ of the control points $\overline{\omega}_k$ may be decoded directly from the bitstream B.

In one embodiment of step 210, the angular coordinates $(\phi_k,\theta_k)$ of the control points $\overline{\omega}_k$ may be predictive decoded from the bitstream B.

In one variant, the coordinates $(\phi_k,\theta_k)$ or the angular residual $(\phi_{k,res},\theta_{k,res})$ may be decoded before inverse quantized.

In one variant, the angular residual $(\phi_{k,res},\theta_{k,res})$ may be further decompressed by using an entropy decoder like CABAC after binarization of their values.

Any other entropy decoder may be used.

In one embodiment of step 210, a two-dimensional curve representing the sensing path SP may be obtained by interpolation between the control points $\overline{\omega}_k$. For example, a linear interpolation may be used. In another other example, higher order interpolation may be used like third order splines.

In one embodiment of step 210, when the sensing path SP does not vary with time, the information I(SP) may be decoded from an element of a High-Level Syntax (HLS), for example in a Sequence Parameter Set (SPS). Then, the decoded sensing path may be used for several instances of the point cloud (point cloud frames).

In one embodiment of step 210, when the sensing path SP is frame dependent, the information I(SP) may be decoded from a High-Level Syntax example in a Geometry Parameter Set (GPS) of a current point cloud frame. This requires the determination of the sensing path before decoding in the GPS and may lead to a latency up to one frame.

In another embodiment of step 210, the information I(SP) may be decoded from the bitstream B carrying encoded point cloud data.

By doing so, decoding on-the-fly the sensing path SP preserves the low latency advantage of the coarse representation as it requires only a local determination of the sensing path before coding.

Referring to FIG. 18, steps 220-260 and steps 150 and 160 run for each point P of the point cloud to be decoded.

In step 220, one order index difference Δo may be decoded from the bitstream B for a point P of the point cloud to be decoded.

The order index difference Δo represents a difference between an order index o(P) of a coarse point associated with the point P, and an order index $o(P_{-1})$ of another coarse point associated with a previous decoded point $P_{-1}$ of the point cloud.

In one variant, the order index $o(P_1)$ of the first coarse point (occupied by the first point $P_1$ of the point cloud to be decoded) may be directly decoded from the bitstream B.

In one variant, the order index differences $\Delta o_n$ may be decompressed using an entropy decoder like CABAC after binarization of their values.

Any other entropy decoder may be used.

In step 230, one sensor index λ associated with a sensor that sensed the point P and one sample index s associated with the sensing time instant of the point P may be obtained from an order index o(P) obtained from the decoded order index difference Δo.

The sensor index λ and the sample index s may be obtained from the order index o(P) by:

$$\lambda = o(P) \text{ modulo } K$$

$$s = o(P)/K$$

where the division/K is the integer division (aka Euclidian division). Therefore, $o(P_1)$ and Δo are an alternative representation of λ and s.

In step 150, one sensing point $P_{over}(s)$ in the two-dimensional angular coordinate (ϕ,θ) space may be obtained from the sample index s according to the sensing scheme as above discussed.

In step 160, a coarse point $P_\lambda(s)$ in the two-dimensional angular coordinate space may be obtained by shifting the sensing point $P_{over}(s)$ in the two-dimensional angular coordinate (ϕ,θ) space as above explained.

In step 240, a point P of the point cloud may be decoded relatively to the coarse point $P_\lambda(s)$.

In one embodiment of step 240, decoding a point P of the point cloud from a coarse point $P_\lambda(s)$ may comprise decoding an angular residual (res(ϕ), res(θ)) and obtaining angular coordinates $(\phi_{rec},\theta_{rec})$ of a reconstructed point $P_{rec}$ by adding said decoded angular residual (res(ϕ), res(θ)) and angular coordinates $(\phi_\lambda,\theta_\lambda)$ of the coarse point $P_\lambda(s)$ (equation 1).

In step 270, the cartesian coordinates $(x_p, y_p, z_p)$ of the point P may then be the cartesian coordinates $(x_{p,rec}, y_{p,rec}, z_{p,rec})$ obtained from the angular coordinates $(\phi_{rec},\theta_{rec})$ of a reconstructed point $P_{rec}$ and a radius value $r_{p,rec}$ by equation (2).

Optionally, the method 200 may further comprise in step 250, decoding, from the bitstream B, the radius value $r_{p,rec}$.

In one embodiment of step 250, the radius value $r_{p,rec}$ is entropy-decoded from the bitstream B.

In one embodiment of step 250, the radius value $r_{p,dec}$ may be inverse quantized by the inverse quantizer IQ1. Any other inverse quantizer may be used.

In an embodiment of step 250, the radius value $r_{p,rec}$ may be decoded and inverse quantized.

In one variant, the quantized radius value may be entropy decoded using an entropy coder like CABAC after binarization of their values.

Any other entropy coder may be used.

In one embodiment of step 250, the radius value $r_{p,rec}$ represents a three-dimensional radius $r_{3D}$.

In one embodiment of step 250, the radius value $r_{p,rec}$ represents the projected radius $r_{2D}$ on the horizontal xy plane as depicted on FIG. 4.

In one embodiment, the method 200 further comprises in step 260, decoding a cartesian coordinate residual ($x_{p,res}$, $y_{p,res}$, $z_{p,res}$) from the bitstream B. The cartesian coordinate residual ($x_{p,res}$, $y_{p,res}$, $z_{p,res}$) is given by equation (3).

In step 270, the cartesian coordinates ($x_p$, $y_p$, $z_p$) of the point P may then be obtained by adding the decoded cartesian coordinate residual ($x_{p,res}$, $y_{p,res}$, $z_{p,res}$) and the cartesian coordinates of the reconstructed point $P_{rec}$:

$$(x_p, y_p, z_p) = (x_{p,res}, y_{p,res}, z_{p,res}) + (x_{p,rec}, y_{p,rec}, z_{p,rec})$$

In one variant, the cartesian coordinate residual ($x_{p,res}$, $y_{p,res}$, $z_{p,res}$) may be obtained by decoding and inverse quantizing using the inverse quantizer IQ2.

Any other inverse quantizer may be used.

In one variant, the decoding may be an entropy decoder using an entropy decoder like CABAC after binarization of values.

Any other entropy decoder may be used.

In one variant, an angular residual (res(ϕ), res(θ)) may be obtained by decoding and inverse quantizing using the inverse quantizer Q3.

Any other quantizer and inverse quantizer may be used.

In one variant, the decoding may be an entropy decoder using an entropy decoder like CABAC after binarization of values.

Any other entropy decoder may be used.

Angular coordinates of the reconstructed point $P_{rec}$ (equation 1) are then obtained by:

$$(\phi_{rec}, \theta_{rec}) = (\phi_\lambda, \theta_\lambda) + IQ3(Q3(res(\phi), res(\theta)))$$

Figure 19:
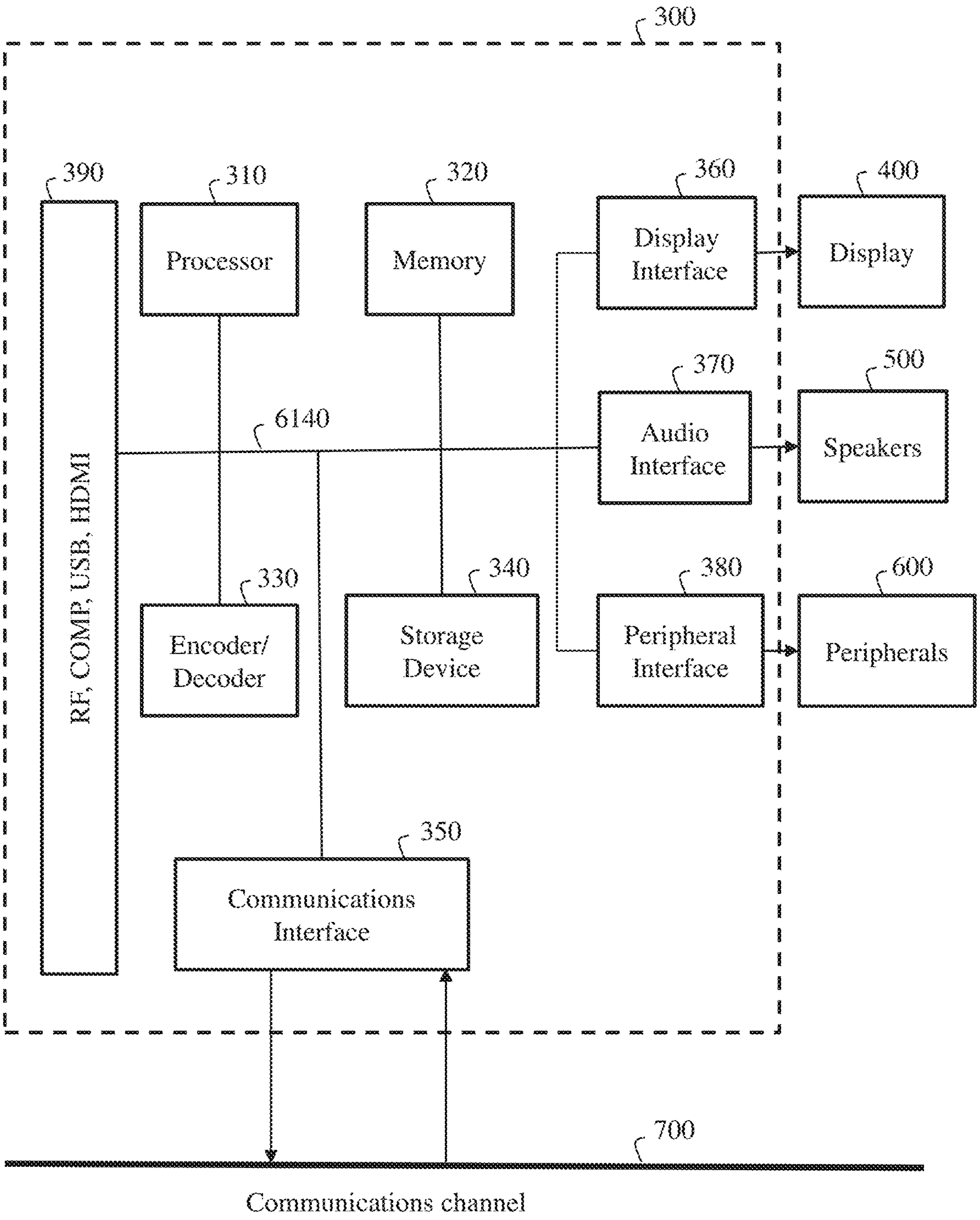
FIG. 19 illustrates a schematic block diagram of an example of a system in which various aspects and embodiments are implemented.

FIG. 19 shows a schematic block diagram illustrating an example of a system in which various aspects and embodiments are implemented.

System 300 may be embedded as one or more devices including the various components described below. In various embodiments, the system 300 may be configured to implement one or more of the aspects described in the present disclosure.

Examples of equipment that may form all or part of the system 300 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 300, singly or in combination, may be embodied in a single integrated circuit (IC), multiple ICs, and/or discrete components. For example, in at least one embodiment, the processing and encoder/decoder elements of system 300 may be distributed across multiple ICs and/or discrete components. In various embodiments, the system 300 may be communicatively coupled to other similar systems, or to other electronic devices, via, for example, a communications bus or through dedicated input and/or output ports.

The system 300 may include at least one processor 310 configured to execute instructions loaded therein for implementing, for example, the various aspects described in the present disclosure. Processor 310 may include embedded memory, input output interface, and various other circuitries as known in the art. The system 300 may include at least one memory 320 (for example a volatile memory device and/or a non-volatile memory device). System 300 may include a storage device 340, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 340 may include an internal storage device, an attached storage device, and/or a network accessible storage device, as non-limiting examples.

The system 300 may include an encoder/decoder module 330 configured, for example, to process data to provide encoded/decoded point cloud geometry data, and the encoder/decoder module 330 may include its own processor and memory. The encoder/decoder module 330 may represent module(s) that may be included in a device to perform the encoding and/or decoding functions. As is known, a device may include one or both encoding and decoding modules. Additionally, encoder/decoder module 330 may be implemented as a separate element of system 300 or may be incorporated within processor 310 as a combination of hardware and software as known to those skilled in the art.

Program code to be loaded onto processor 310 or encoder/decoder module 330 to perform the various aspects described in the present disclosure may be stored in storage device 340 and subsequently loaded onto memory 320 for execution by processor 310. In accordance with various embodiments, one or more of processor 310, memory 320, storage device 340, and encoder/decoder module 330 may store one or more of various items during the performance of the processes described in the present disclosure. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 310 and/or the encoder/decoder module 330 may be used to store instructions and to provide working memory for processing that may be performed during encoding or decoding.

In other embodiments, however, a memory external to the processing device (for example, the processing device may be either the processor 310 or the encoder/decoder module 330) may be used for one or more of these functions. The external memory may be the memory 320 and/or the storage device 340, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 300 may be provided through various input devices as indicated in block 390. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 390 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 300 to other electronic devices across USB and/or HDMI connections. It is to be understood that various aspects of input processing, for example, Reed-Solomon error correction, may be implemented, for example, within a separate input processing IC or within processor 310 as necessary. Similarly, aspects of USB or HDMI interface processing may be implemented within separate interface ICs or within processor 310 as necessary. The demodulated, error corrected, and demultiplexed stream may be provided to various processing elements, including, for example, processor 310, and encoder/decoder module 330 operating in combination with the memory and storage elements to process the data stream as necessary for presentation on an output device.

Various elements of system 300 may be provided within an integrated housing. Within the integrated housing, the various elements may be interconnected and transmit data therebetween using suitable connection arrangement of block 390, for example, an internal bus as known in the art, including the I2C bus, wiring, and printed circuit boards.

The system 300 may include communication interface 350 that enables communication with other devices via communication channel 700. The communication interface 350 may include, but is not limited to, a transceiver configured to transmit and to receive data over communication channel 700. The communication interface 350 may include, but is not limited to, a modem or network card and the communication channel 700 may be implemented, for example, within a wired and/or a wireless medium.

Data may be streamed to the system 300, in various embodiments, using a Wi-Fi network such as IEEE 802.11. The Wi-Fi signal of these embodiments may be received over the communications channel 700 and the communications interface 350 which are adapted for Wi-Fi communications. The communications channel 700 of these embodiments may be typically connected to an access point or router that provides access to outside networks including the Internet for allowing streaming applications and other over-the-top communications.

Other embodiments may provide streamed data to the system 300 using a set-top box that delivers the data over the HDMI connection of the input block 390.

Still other embodiments may provide streamed data to the system 300 using the RF connection of the input block 390.

The streamed data may be used as a way for signaling information used by the system 300. The signaling information may comprise the bitstream B and/or information such a number of points of a point cloud, coordinates and/or sensor setup parameters.

It is to be appreciated that signaling may be accomplished in a variety of ways. For example, one or more syntax elements, flags, and so forth may be used to signal information to a corresponding decoder in various embodiments.

The system 300 may provide an output signal to various output devices, including a display 400, speakers 500, and other peripheral devices 600. The other peripheral devices 600 may include, in various examples of embodiments, one or more of a stand-alone DVR, a disk player, a stereo system, a lighting system, and other devices that provide a function based on the output of the system 300.

In various embodiments, control signals may be communicated between the system 300 and the display 400, speakers 500, or other peripheral devices 600 using signaling such as AV.Link (Audio/Video Link), CEC (Consumer Electronics Control), or other communications protocols that enable device-to-device control with or without user intervention.

The output devices may be communicatively coupled to system 300 via dedicated connections through respective interfaces 360, 370, and 380.

Alternatively, the output devices may be connected to system 300 using the communications channel 700 via the communications interface 350. The display 400 and speakers 500 may be integrated in a single unit with the other components of system 300 in an electronic device such as, for example, a television.

In various embodiments, the display interface 360 may include a display driver, such as, for example, a timing controller (T Con) chip.

The display 400 and speaker 500 may alternatively be separate from one or more of the other components, for example, if the RF portion of input of block 390 is part of a separate set-top box. In various embodiments in which the display 400 and speakers 500 may be external components, the output signal may be provided via dedicated output connections, including, for example, HDMI ports, USB ports, or COMP outputs.

Various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts.

Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 310 or by hardware, or by a combination of hardware and software. As a non-limiting example, the embodiments may be also implemented by one or more integrated circuits. The memory 320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 310 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination. When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "obtaining" various pieces of information. Obtaining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, “receiving” is typically involved, in one way or another, during operations such as, for example, storing the information, processing the information, transmitting the information, moving the information, copying the information, erasing the information, calculating the information, determining the information, predicting the information, or estimating the information.

Also, as used herein, the word “signal” refers to, among other things, indicating something to a corresponding decoder. For example, in certain embodiments the encoder signals a particular information such a number of points of the point cloud or coordinates or sensor setup parameters. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word “signal”, the word “signal” may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding points of a point cloud sensed by at least one sensor associated with a sensor index into a bitstream of encoded point cloud data, wherein the method comprises:

encoding, into the bitstream, an information (I(SP)) representing a sensing path, wherein the sensing path is defined in a two-dimensional angular coordinate space comprising an azimuthal coordinate representative of an azimuthal angle representing a sensing angle of a sensor relative to a referential and an elevation coordinate representative of an elevation angle of a sensor relative to a horizontal referential plane;

the sensing path is used to sense the points of the point cloud according to ordered coarse points representing potential locations of sensed points of the point cloud, each coarse point being defined in the two-dimensional angular coordinate space from one sample index associated with a sensing time instant and one sensor index associated with a sensor;

the sample index is defined along the sensing path according to a sensing scheme;

for each point (P) of the point cloud, obtaining one sensing point ($P_{over}(s)$) in the two-dimensional angular coordinate space from a sample index(s) associated with a sensing time instant of the point (P) of the point cloud along the sensing path, and the sensing scheme;

obtaining one coarse point ($P_\lambda(s)$) in the two-dimensional angular coordinate space by shifting the sensing point ($P_{over}(s)$) in the two-dimensional angular coordinate ($\phi,\theta$) space with shifting values that depend on the sensor index associated with the sensor that sensed the point (P) of the point cloud; and encoding, into the bitstream, the point (P) of the point cloud relatively to the coarse point ($P_\lambda(s)$);

wherein angular coordinates ($\phi_\lambda,\theta_\lambda$) of the coarse point ($P_\lambda(s)$) is obtained by shifting angular coordinates of the sensing point ($P_{over}(s)$) in the two-dimensional angular coordinate space by an azimuthal angle shifting coefficient ($\delta\phi_\lambda$) and an elevation angle shifting coefficient ($\delta\theta_\lambda$), both depending on the sensor index ($\lambda$);

wherein the angular coordinates ($\phi_\lambda,\theta_\lambda$) of the coarse point ($P_\lambda(s)$) is obtained by further shifting the angular coordinates of the sensing point ($P_{over}(s)$) in the two-dimensional angular coordinate space by an offset depending on a sensing delay ($\Delta t_\lambda$) and a two-dimensional angular velocity (v(s)) of the sensing point ($P_{over}(s)$).

2. The method of claim 1, wherein the azimuthal angle shifting coefficient ($\delta\phi_\lambda$), the elevation angle shifting coefficient ($\delta\theta_\lambda$), or the azimuthal angle shifting coefficient ($\delta\phi_\lambda$) and the elevation angle shifting coefficient ($\delta\theta_\lambda$) are encoded or decoded relatively to at least one previously encoded azimuthal angle shifting coefficient ($\delta\phi_{\lambda'},\delta\phi_{\lambda''}$) and at least one previously encoded elevation angle shifting coefficient ($\delta\theta_{\lambda'},\delta\theta_{\lambda''}$) corresponding to at least one other sensor index ($\lambda',\lambda''$).

3. The method of claim 1, wherein the azimuthal angle shifting coefficients ($\delta\phi_\lambda$) equal zero.

4. The method of claim 1, wherein the sum of the azimuthal angle shifting coefficients ($\delta\phi_\lambda$) equals 0 and the sum of elevation angle shifting coefficients ($\delta\theta_\lambda$) equals 0.

5. The method of claim 1, wherein the sensing delay ($\Delta t_\lambda$) is encoded into the bitstream.

6. The method of claim 1, wherein the sensing path corresponds to a sensing trajectory of a particular sensor ($\lambda_{ref}$) of reference.

7. A non-transitory storage medium carrying instructions of program code for executing the method of claim 1.

8. A method of decoding points of a point cloud sensed by at least one sensor associated with a sensor index from a bitstream of encoded point cloud data, wherein the method comprises:

decoding, from the bitstream, an information (I(SP)) representing a sensing path wherein the sensing path is defined in a two-dimensional angular coordinate space comprising an azimuthal coordinate representative of an azimuthal angle representing a sensing angle of a sensor relative to a referential and an elevation coordinate representative of an elevation angle of a sensor relative to a horizontal referential plane;

the sensing path has been used to sense the points of the point cloud according to ordered coarse points representing potential locations of sensed points of the point cloud, each coarse point being defined in the two-dimensional angular coordinate space from one sample index associated with a sensing time instant and one sensor index associated with a sensor;

the sample index is defined along the sensing path according to a sensing scheme;

for each point (P) of the point cloud, obtaining one sensing point ($P_{over}(s)$) in the two-dimensional angular coordinate space from a sample index(s) associated with a sensing time instant of the point (P) of the point cloud along the sensing path, and the sensing scheme;

obtaining a coarse point ($P_\lambda(s)$) in the two-dimensional angular coordinate space by shifting the sensing point ($P_{over}(s)$) in the two-dimensional angular coordinate ($\phi$,$\theta$) space with shifting values that depend on the sensor index ($\lambda$) associated with the sensor that sensed the point (P) of the point cloud; and decoding a point of the point cloud relatively to the coarse point ($P_\lambda(s)$);

wherein angular coordinates ($\phi_\lambda$,$\theta_\lambda$) of the coarse point ($P_\lambda(s)$) are obtained by shifting angular coordinates of the sensing point ($P_{over}(s)$) in the two-dimensional angular coordinate space by an azimuthal angle shifting coefficient ($\delta\phi_\lambda$) and an elevation angle shifting coefficient ($\delta\theta_\lambda$), both depending on the sensor index ($\lambda$);

wherein the angular coordinates ($\phi_\lambda$,$\theta_\lambda$) of the coarse point ($P_\lambda(s)$) is obtained by further shifting the angular coordinates of the sensing point ($P_{over}(s)$) in the two-dimensional angular coordinate space by an offset depending on a sensing delay ($\Delta t_\lambda$) and a two-dimensional angular velocity (v(s)) of the sensing point ($P_{over}(s)$).

9. An apparatus of decoding points of a point cloud sensed by at least one sensor associated with a sensor index from a bitstream of encoded point cloud data, wherein the apparatus comprises at least one processor configured to perform the method of claim 8.

10. A non-transitory storage medium carrying instructions of program code for executing the method of claim 2.

11. The method of claim 2, wherein the azimuthal angle shifting coefficient ($\delta\phi_\lambda$), the elevation angle shifting coefficient ($\delta\theta_\lambda$), or the azimuthal angle shifting coefficient ($\delta\phi_\lambda$) and the elevation angle shifting coefficient ($\delta\theta_\lambda$) are encoded or decoded relatively to at least one previously encoded azimuthal angle shifting coefficient ($\delta\phi_{\lambda'}$,$\delta\phi_{\lambda''}$) and at least one previously encoded elevation angle shifting coefficient ($\delta\theta_{\lambda'}$,$\delta\theta_{\lambda''}$) corresponding to at least one other sensor index ($\lambda'$,$\lambda''$).

12. The method of claim 8, wherein the azimuthal angle shifting coefficients ($\delta\phi_\lambda$) equal zero.

13. The method of claim 8, wherein the sum of the azimuthal angle shifting coefficients ($\delta\phi_\lambda$) equals 0 and the sum of elevation angle shifting coefficients ($\delta\theta_\lambda$) equals 0.

14. The method of claim 8, wherein the sensing delay ($\Delta t_\lambda$) is encoded into the bitstream.

15. The method of claim 8, wherein the sensing path corresponds to a sensing trajectory of a particular sensor ($\lambda_{ref}$) of reference.

16. An apparatus of encoding points of a point cloud sensed by at least one sensor associated with a sensor index into a bitstream of encoded point cloud data, wherein the apparatus comprises at least one processor configured to:

encode, into the bitstream, an information (I(SP)) representing a sensing path, wherein the sensing path is defined in a two-dimensional angular coordinate space comprising an azimuthal coordinate representative of an azimuthal angle representing a sensing angle of a sensor relative to a referential and an elevation coordinate representative of an elevation angle of a sensor relative to a horizontal referential plane; and the sensing path is used to sense the points of the point cloud according to ordered coarse points representing potential locations of sensed points of the point cloud, each coarse point being defined in the two-dimensional angular coordinate space from one sample index associated with a sensing time instant and one sensor index associated with a sensor;

wherein the sample index is defined along the sensing path according to a sensing scheme;

for each point (P) of the point cloud, obtain one sensing point ($P_{over}(s)$) in the two-dimensional angular coordinate space from a sample index(s) associated with a sensing time instant of the point (P) of the point cloud along the sensing path, and the sensing scheme;

obtain one coarse point ($P_\lambda(s)$) in the two-dimensional angular coordinate space by shifting the sensing point ($P_{over}(s)$) in the two-dimensional angular coordinate ($\phi$,$\theta$) space with shifting values that depend on the sensor index associated with the sensor that sensed the point (P) of the point cloud; and encode, into the bitstream, the point (P) of the point cloud relatively to the coarse point ($P_\lambda(s)$);

wherein angular coordinates ($\phi_\lambda$,$\theta_\lambda$) of the coarse point ($P_\lambda(s)$) is obtained by shifting angular coordinates of the sensing point ($P_{over}(s)$) in the two-dimensional angular coordinate space by an azimuthal angle shifting coefficient ($\delta\phi_\lambda$) and an elevation angle shifting coefficient ($\delta\theta_\lambda$), both depending on the sensor index ($\lambda$);

wherein the angular coordinates ($\phi_\lambda$,$\theta_\lambda$) of the coarse point ($P_\lambda(s)$) is obtained by further shifting the angular coordinates of the sensing point ($P_{over}(s)$) in the two-dimensional angular coordinate space by an offset depending on a sensing delay ($\Delta t_\lambda$) and a two-dimensional angular velocity (v(s)) of the sensing point ($P_{over}(s)$).

* * * * *